(12) United States Patent
Peterson

(10) Patent No.: US 12,190,467 B2
(45) Date of Patent: Jan. 7, 2025

(54) MODIFYING PARAMETRIC CONTINUITY OF DIGITAL IMAGE CONTENT IN PIECEWISE PARAMETRIC PATCH DEFORMATIONS

(71) Applicant: Adobe Inc., San Jose, CA (US)

(72) Inventor: John Peterson, Menlo Park, CA (US)

(73) Assignee: Adobe Inc., San Jose, CA (US)

( * ) Notice: Subject to any disclaimer, the term of this patent is extended or adjusted under 35 U.S.C. 154(b) by 186 days.

(21) Appl. No.: 18/152,981

(22) Filed: Jan. 11, 2023

(65) Prior Publication Data

US 2024/0054600 A1 Feb. 15, 2024

Related U.S. Application Data

(60) Provisional application No. 63/371,140, filed on Aug. 11, 2022.

(51) Int. Cl.
*G06T 3/18* (2024.01)
*G06T 11/60* (2006.01)

(52) U.S. Cl.
CPC ............ *G06T 3/18* (2024.01); *G06T 11/60* (2013.01); *G06T 2200/24* (2013.01)

(58) Field of Classification Search
None
See application file for complete search history.

(56) References Cited

U.S. PATENT DOCUMENTS

| | | |
|---|---|---|
| 6,608,631 B1 | 8/2003 | Milliron |
| 6,803,913 B1 | 10/2004 | Fushiki et al. |
| 6,911,980 B1 * | 6/2005 | Newell .................. G06T 17/30 345/647 |
| 7,385,612 B1 | 6/2008 | Peterson |
| 7,412,360 B2 * | 8/2008 | Surazhsky ............ G06T 11/203 703/2 |
| 7,453,474 B2 | 11/2008 | Faraday et al. |

(Continued)

OTHER PUBLICATIONS

U.S. Appl. No. 16/141,276, Apr. 26, 2019, Preinterview 1st Office Action.

(Continued)

*Primary Examiner* — Ryan M Gray
(74) *Attorney, Agent, or Firm* — Keller Preece PLLC

(57) ABSTRACT

Methods, systems, and non-transitory computer readable storage media are disclosed for modifying parametric continuity between portions of a digital image in piecewise parametric patch deformations. For example, the disclosed system determine parametric patches in a parametric quilt corresponding to a digital image in response to a request to deform the digital image. The disclosed system divides the digital image into a plurality of separate portions along edges of the parametric patches, each parametric patch comprising a separate set of control points. The disclosed system generates sets of interactive handles for each anchor control point in the parametric patch corresponding to metadata flags that determine parametric continuities between portions of the digital image. Additionally, in response to a user input, the disclosed system modifies the parametric continuity at a portion of the digital image corresponding to an anchor control point by modifying a metadata flag for the control point.

20 Claims, 17 Drawing Sheets

(56) References Cited

U.S. PATENT DOCUMENTS

| | | | |
|---|---|---|---|
| 7,626,589 B2* | 12/2009 | Berger | G06T 15/04 345/428 |
| 7,812,850 B1 | 10/2010 | Nelson | |
| 8,633,930 B2* | 1/2014 | Mansfield | G06T 11/60 345/472.3 |
| 8,760,467 B2* | 6/2014 | Peterson | G06T 11/60 345/646 |
| 8,970,628 B1 | 3/2015 | Jensen et al. | |
| 10,510,186 B2* | 12/2019 | Batra | G06T 11/00 |
| 10,832,376 B2 | 11/2020 | Peterson | |
| 2004/0024575 A1* | 2/2004 | Surazhsky | G06T 3/18 703/2 |
| 2004/0085311 A1* | 5/2004 | Lee | G06T 17/30 345/419 |
| 2006/0290693 A1 | 12/2006 | Zhou et al. | |
| 2008/0162090 A1 | 7/2008 | Perry et al. | |
| 2008/0275677 A1 | 11/2008 | Landon | |
| 2010/0214321 A1 | 8/2010 | Hokkanen et al. | |
| 2013/0120457 A1 | 5/2013 | Popovic et al. | |
| 2013/0162681 A1* | 6/2013 | Peterson | G06T 3/18 345/647 |
| 2014/0267252 A1 | 9/2014 | Hutchinson et al. | |
| 2014/0267306 A1 | 9/2014 | Koniaris et al. | |
| 2016/0162603 A1 | 6/2016 | Schriesheim et al. | |
| 2018/0130256 A1 | 5/2018 | Wampler | |
| 2019/0197771 A1* | 6/2019 | Batra | G06T 11/00 |
| 2020/0098087 A1 | 3/2020 | Peterson et al. | |
| 2020/0320228 A1* | 10/2020 | Lupas | G06F 30/17 |
| 2021/0110603 A1* | 4/2021 | North | G06T 19/20 |
| 2023/0305526 A1* | 9/2023 | Mysore | G05B 19/4099 |

OTHER PUBLICATIONS

U.S. Appl. No. 16/141,276, Jun. 11, 2019, 1st Action Office Action.
U.S. Appl. No. 16/141,276, Jul. 22, 2019, 1st Action Office Action.
U.S. Appl. No. 16/141,276, Nov. 14, 2019, Office Action.
U.S. Appl. No. 16/141,276, Jan. 29, 2020, Notice of Allowance.
U.S. Appl. No. 16/141,347, Jul. 10, 2019, Preinterview 1st Office Action.
U.S. Appl. No. 16/141,347, Aug. 26, 2019, 1st Action Office Action.
U.S. Appl. No. 16/141,347, Nov. 8, 2019, Office Action.
U.S. Appl. No. 16/141,347, May 11, 2020, Notice of Allowance.
U.S. Appl. No. 16/141,226, Apr. 3, 2020, Preinterview 1st Office Action.
U.S. Appl. No. 16/141,226, Jul. 16, 2020, Office Action.
U.S. Appl. No. 16/141,226, Sep. 14, 2020, Notice of Allowance.

* cited by examiner

MODIFYING PARAMETRIC CONTINUITY OF DIGITAL IMAGE CONTENT IN PIECEWISE PARAMETRIC PATCH DEFORMATIONS

CROSS-REFERENCE TO RELATED APPLICATIONS

This application claims priority to U.S. Provisional Application No. 63/371,140, entitled "MODIFYING PARAMETRIC CONTINUITY OF DIGITAL IMAGE CONTENT IN PIECEWISE PARAMETRIC PATCH DEFORMATIONS," filed Aug. 11, 2022, the full disclosure of which is incorporated herein by reference.

BACKGROUND

Improvements to computer processing technologies have led to significant advancements in the field of image processing. Many industries utilize image processing techniques to manipulate digital images in a variety of ways. To illustrate, many entities provide tools for editing a raster image or a vector image by warping or otherwise deforming a digital image via control points (e.g., in a Bézier patch or a Bézier curve) corresponding to the digital image. However, conventional systems have several shortcomings with regard to providing granular control over the warping/deformation operations of digital images and efficiently and accurately achieving desired results.

SUMMARY

One or more embodiments provide benefits and/or solve one or more of the foregoing or other problems in the art with systems, methods, and non-transitory computer readable storage media for modifying parametric continuity of digital image content with piecewise patch-based deformations. For example, in one or more embodiments, the disclosed systems determine parametric patches in a parametric quilt corresponding to a digital image in response to a request to deform the digital image. The disclosed systems divide the digital image into a plurality of separate portions along edges of the parametric patches, each parametric patch including a separate set of control points. The disclosed systems defines sets of interactive handles for anchor control points according to metadata flags that determine parametric continuities between portions of the digital image. Additionally, in response to a user input selecting an anchor control point, the disclosed systems modify the parametric continuity at a portion of the digital image corresponding to the anchor control point by modifying a metadata flag for the anchor control point. The disclosed system thus provides an efficient and flexible interface for controlling parametric continuity when deforming portions of digital image content.

BRIEF DESCRIPTION OF THE DRAWINGS

Various embodiments will be described and explained with additional specificity and detail through the use of the accompanying drawings.

DETAILED DESCRIPTION

Figure 1:
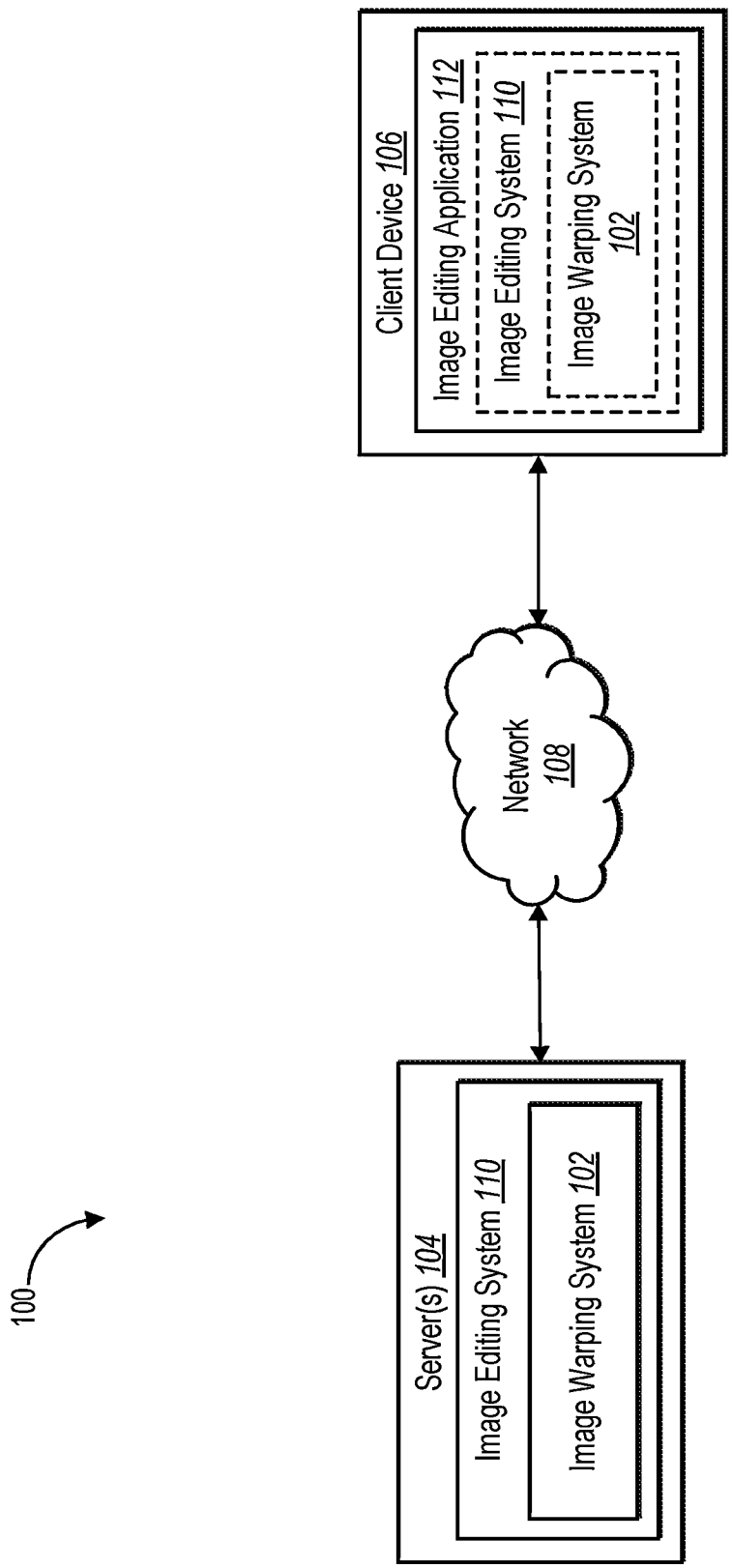
FIG. 1 illustrates an example system environment in which an image warping system operates in accordance with one or more implementations.

One or more embodiments of the present disclosure include an image warping system that performs piecewise deformation of digital images (e.g., raster images or vector images) with customizable parametric continuity. For example, in response to a request to deform a digital image, the image warping system partitions the digital image into a plurality of portions in accordance with an array of parametric patches (e.g., Bézier patches or other spline-based surfaces) in adjacent portions of the digital image. Additionally, the image warping system determines, for a plurality of anchor control points within the parametric quilt, sets of metadata flags according to interactive handles indicating parametric continuity at the locations of the anchor control points. The image warping system also modifies a parametric continuity associated with a selected anchor control point in response to an input modifying a metadata flag associated with the anchor control point. The image warping system thus provides customizable parametric continuity at specified portions of a digital image during a parametric patch-based deformation operation.

As mentioned, in one or more embodiments, the image warping system divides a digital image into a plurality of portions according to a parametric quilt. In particular, in response to a request to deform a digital image, the image warping system uses an array of parametric patches (e.g., in a "parametric quilt" of parametric patches) corresponding to different portions of the digital image. The image warping system also divides the digital image based on the portions corresponding to the plurality of parametric patches. Furthermore, for example, the image warping system generates a plurality of anchor control points at different locations (e.g., edges/corners) of the parametric patches for deforming the digital image utilizing the parametric patches. In one or more embodiments, the image warping system generates a parametric quilt as described in U.S. Pat. No. 10,832,376 titled "GENERATING ENHANCED DIGITAL CONTENT USING PIECEWISE PARAMETRIC PATCH DEFORMATIONS," and in U.S. Pat. No. 10,832,376 titled "GENERATING ENHANCED DIGITAL CONTENT USING PIECEWISE PARAMETRIC PATCH DEFORMATIONS," filed Sep. 25, 2018 to Peterson, which are herein incorporated by reference in its entirety.

In one or more additional embodiments, the image warping system determine interactive handles for anchor control points at corners (or edges, in some cases) of the parametric patches in a parametric quilt. Specifically, the image warping system specifies interactive handles for an anchor control point according to a metadata flag indicating a parametric continuity at a location of the anchor control point. For instance, the image warping system determines a set of interactive handles for the anchor control point including a movement behavior based on the parametric continuity of the corresponding metadata flag.

According to one or more embodiments, the image warping system modifies the parametric continuity for an anchor control point in response to an input. For example, the image warping system modifies a metadata flag associated with an anchor control point in response to an input to change the parametric continuity of the anchor control point. To illustrate, the image warping system sets a continuity status of the metadata flag from an available plurality of possible continuity statuses of the metadata flag to update the parametric continuity between a first portion of the digital image and a second portion of the digital image. Thus, the image warping system provides configurable parametric continuity at the location of the anchor control point between the first portion and the second portion according to the input.

In one or more embodiments, the image warping system modifies the digital image in response to an interaction with an interaction handle of an anchor control point. In particular, the image warping system determines a parametric continuity associated with the anchor control point in connection with the interaction with the interaction handle (e.g., as described below with respect to FIGS. 4A-4C). For example, the image warping system deforms a first portion of the digital image and/or a second portion of the digital image based on the interaction with the interaction handle and according to the parametric continuity of the anchor control point. Accordingly, the image warping system maintains a continuity between the first portion and the second portion or introduces a discontinuity between the first portion and the second portion according to the metadata flag associated with the anchor control point.

Conventional systems have a number of disadvantages with respect to deforming digital images. Specifically, some conventional systems utilize deformation operations that deform a digital image based on a Bézier patch applied to the digital image. For example, such conventional systems provide control points allowing users to interactively deform the digital image via deformations of the corresponding Bézier patch. While these conventional systems provide varying amounts of control over deformations of a digital image, increasing the number of control points increases the computational complexity of a Bézier patch while decreasing the number of control points reduces the flexibility of control.

Furthermore, such conventional systems lack flexibility in the deformation process due to the nature of curves within a Bézier patch applied to a digital image. For example, determining deformations of a digital image based on a plurality of Bézier curves in a Bézier patch limits the types of deformations applied to digital images. To illustrate, the conventional systems inherently limit deformations to continuous deformations (e.g., C1 continuity indicating that two segments connected at a joint share the same first derivative at the joint) due to the nature of Bézier curves, thereby resulting in smooth deformations across portions of a digital image. Accordingly, the conventional systems lack flexibility and usability because the systems provide limited deformation operations according to one or more Bézier curves associated with the deformations.

The image warping system provides a number of advantages over conventional systems in connection with deforming digital images. For example, the image warping system improves flexibility and efficiency of computing devices via a piecewise patch-based deformation process. In contrast to conventional systems that utilize a single Bézier patch to apply deformations to a digital image, the image warping system applies a plurality of separate parametric patches to a plurality of different portions of a digital image. In particular, the image warping system improves flexibility by providing separate deformation control over separate portions of a digital image via individual interactions of anchor control points in the parametric patches.

Furthermore, the image warping system provides improved flexibility in image deformation operations by providing continuity control at a plurality of separate anchor points in a parametric quilt. For example, the image warping system provides individual continuity control at a plurality of separate points at corners or along edges of parametric patches in a parametric quilt. For instance, the image warping system provides intuitive, simple controls that modify the continuity across parametric patches of a parametric quilt by changing the parametric continuity among a plurality of continuity statuses in metadata flags associated with the anchor control points. By storing the continuity status of each anchor control point in metadata flags, the image warping system provides greater control over the deformation of a digital image while allowing different types of continuity at the individual anchor control points. Additionally, the image warping system provides visual indicators of the parametric continuity of anchor control points in a deformation operation for better usability within a graphical user interface.

Turning now to the figures, FIG. 1 includes an embodiment of a system environment 100 in which an image warping system 102 is implemented. In particular, the system environment 100 includes server device(s) 104 and a client device 106 in communication via a network 108. Moreover, as shown, the server device(s) 104 include an image editing system 110, which includes the image warping system 102. Additionally, the client device 106 includes an image editing application 112, which optionally includes the image editing system 110 and the image warping system 102.

As shown in FIG. 1, the client device 106 or the server device(s) 104 includes or hosts the image editing system 110. The image editing system 110 includes, or is part of, one or more systems that implement digital image editing operations. For example, the image editing system 110 provides tools for performing various operations on digital images. To illustrate, the image editing system 110 communicates with the client device 106 via the network 108 to provide the tools for display and interaction via the image editing application 112 at the client device 106. Additionally, in some embodiments, the image editing system 110 receives requests to access digital images stored (e.g., at the server device(s) 104 or at another device such as a digital content database) and/or requests to store digital images. In some embodiments, the image editing system 110 receives interaction data for viewing, generating, or editing a digital image, processes the interaction data (e.g., to view, generate, or edit a digital image), and provides the results of the interaction data for display via the image editing application 112 or to a third-party system.

According to one or more embodiments, the image editing system 110 utilizes the image warping system 102 to deform digital images. In particular, in connection with editing digital images, the image editing system 110 utilizes the image warping system 102 to generate a parametric quilt in response to a request to deform a digital image. The image warping system 102 generates the parametric quilt to include a plurality of parametric patches corresponding to different portions of the digital image. Additionally, the image warping system 102 provides a plurality of anchor control points for deforming portions of the digital image according to the plurality of parametric patches. Furthermore, in one or more embodiments, the image warping system 102 provides tools for interacting with the anchor control points to independently control parametric continuity at the anchor control points (e.g., visible points for controlling a warp patch at edges or corners of one or more portions of the digital image). The image warping system 102 also provides tools for deforming the digital image utilizing the parametric quilt and based on selected parametric continuities of the anchor control points.

As illustrated in FIG. 1, the image warping system 102 can be implemented on the client device 106 or on the server device(s) 104. In particular, in some implementations, the image warping system 102 on the server device(s) 104 supports the image warping system 102 on the client device 106. For instance, the server device(s) 104 generates or obtains the image warping system 102 for the client device 106 (e.g., as part of a software application or suite). The server device(s) 104 provides the image warping system 102 to the client device 106 for performing digital image deformation process at the client device 106. In other words, the client device 106 obtains (e.g., downloads) the image warping system 102 from the server device(s) 104. At this point, the client device 106 is able to utilize the image warping system 102 to deform digital images and customize parametric continuity in a parametric quilt independently from the server device(s) 104.

In additional embodiments, although FIG. 1 illustrates the server device(s) 104 and the client device 106 communicating via the network 108 (as described below in relation to FIG. 11), the various components of the system environment 100 communicate and/or interact via other methods (e.g., the server device(s) 104 and the client device 106 communicate directly). Furthermore, although FIG. 1 illustrates the image warping system 102 being implemented by a particular component and/or device within the system environment 100, the image warping system 102 is implemented, in whole or in part, by other computing devices and/or components in the system environment 100. For example, in some embodiments, the server device(s) 104 include or host the image editing system 110 and/or the image warping system 102.

To illustrate, the image warping system 102 includes a web hosting application that allows the client device 106 to interact with content and services hosted on the server device(s) 104 (e.g., in a software as a service implementation). For example, in one or more implementations, the client device 106 accesses a web page supported by the server device(s) 104. The client device 106 provides input to the server device(s) 104 to perform digital image editing operations and, in response, the image warping system 102 or the image editing system 110 on the server device(s) 104 performs operations to modify parametric continuity of anchor control points in a parametric quilt and/or to perform digital image deformation operations. The server device(s) 104 provide the output or results of the operations to the client device 106.

In one or more embodiments, the server device(s) 104 include a variety of computing devices, including those described below with reference to FIG. 11. For example, the server device(s) 104 includes one or more servers for storing and processing data associated with editing digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 11). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, and interacting with digital images. Although FIG. 1 illustrates the system environment 100 with a single client device, in some embodiments, the system environment 100 includes a different number of client devices.

Figure 2:
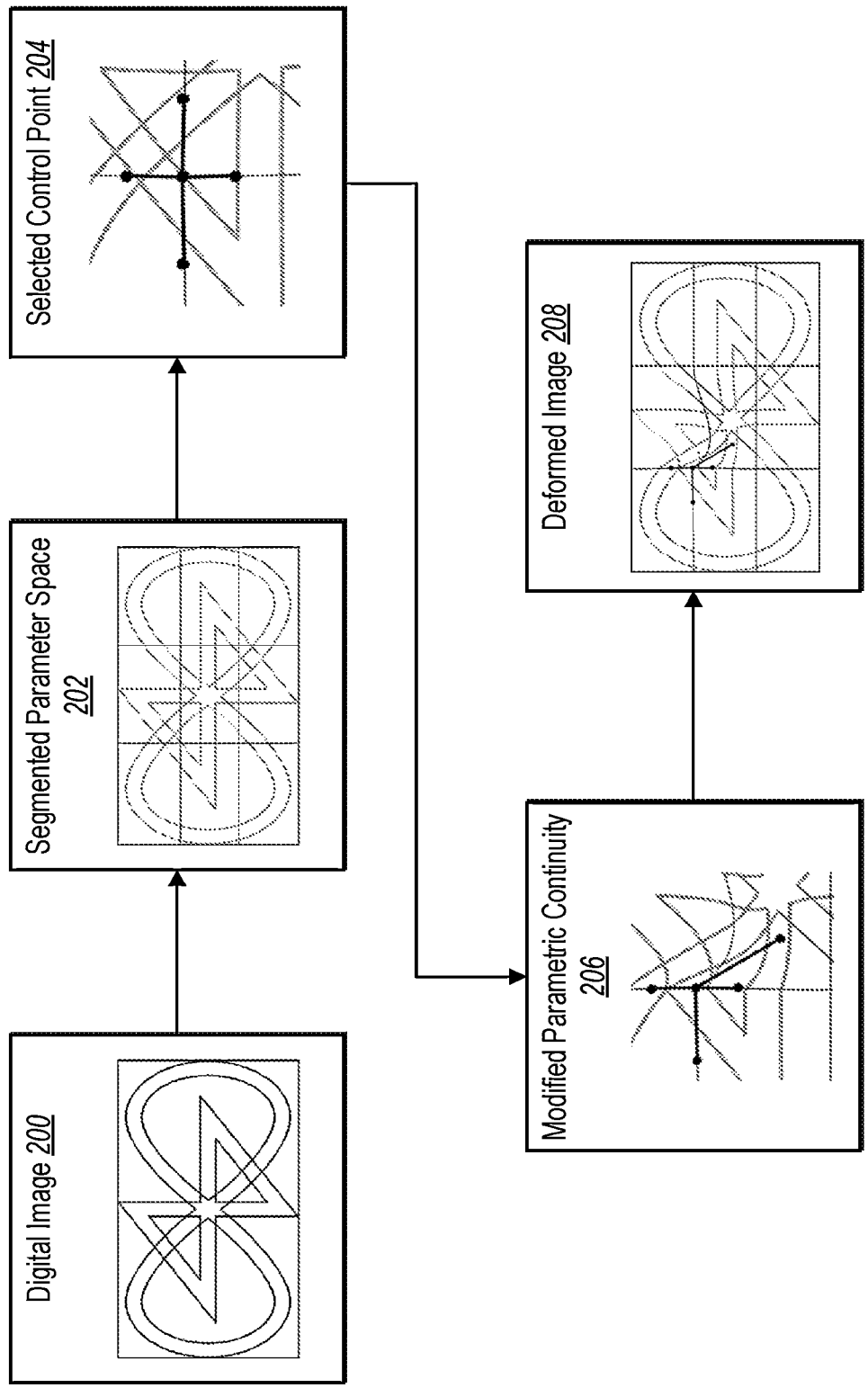
FIG. 2 illustrates a diagram of an overview of the image warping system deforming a digital image via a piecewise patch-based deformation with parametric discontinuity in accordance with one or more implementations.

As mentioned, the image warping system 102 controls parametric continuities in a parametric quilt according to individually customizable anchor control points. FIG. 2 illustrates an overview of the image warping system 102 modifying a digital image via a modified parametric continuity at an edge of a parametric patch in a parametric quilt corresponding to a digital image. Specifically, FIG. 2 illustrates that the image warping system 102 provides customizable parametric continuity of individual anchor control points in a parametric quilt for modifying separate portions of the digital image based on the customized parametric continuities.

In one or more embodiments, as illustrated in FIG. 2, the image warping system 102 determines a digital image 200 for editing via one or more deformation operations. For example, the digital image 200 includes a raster image with image content represented via a plurality of pixels (e.g., including images of file formats such as GIF, JPEG, PNG, and TIFF). Alternatively, the digital image 200 includes a vector image with image content represented via one or more mathematical curves or lines (e.g., including images of file formats such as SVG, EPS, and PDF). Furthermore, in one or more embodiments, a digital image includes pictures or text. Accordingly, the image warping system 102 provides image deformation operations for raster images and/or vector images.

As illustrated in FIG. 2, according to one or more embodiments, the image warping system 102 determines a segmented parameter space 202 corresponding to the digital image 200. Specifically, the image warping system 102 generates the segmented parameter space 202 in response to a request to deform the digital image via a piecewise patch-based deformation process. For example, the image warping system 102 generates a parametric quilt with an array of parametric patches corresponding to different portions of the digital image 200. In one or more embodiments, a parameter space for the digital image 200 includes interactive elements in a graphical user interface for modifying the digital image 200 in an image warping operation. Accordingly, the image warping system 102 determines the segmented parameter space 202 by separating the parameter space for the digital image 200 into a plurality of parametric patches in the parametric quilt.

In one or more embodiments, a parametric patch includes a spline surface used in computer-aided design for modifying digital content. In particular, a parametric patch includes a smooth-continuous surface defined by a number of control points (e.g., control points that modify the surface from a unit square). To illustrate, a parametric patch includes a Bézier patch or surface. For example, a bicubic Bézier patch includes a 4×4 grid of control points (i.e., 16 total control points) defining a shape of the Bézier surface based on a positioning of the control points. More specifically, control points within a Bézier patch define parametric curves that are interpolated based on the position of the corresponding control points and determine the shape of the Bézier patch as a whole. While many examples described herein utilize Bézier patches, a parametric patch alternatively includes one or more other types of splines such as, but not limited to, patches defined with Hermite curves, B-splines, non-uniform rational basis splines, Kappa-curves, Catmull-Rom splines or another parametric patch able to approximate a dense series of points.

In some embodiments, a parametric patch includes anchor control points along an outer edge of the patch for interactively manipulating a warp operation for a corresponding portion of a digital image. For example, the parametric patch includes four anchor control points at corners of the parametric patch. Accordingly, coincident control points at corners of two or more parametric patches provide anchor control points for the two or more parametric patches. In additional embodiments, the parametric patch includes one or more anchor control points along an edge of the parametric patch (e.g., between two corner control points).

Furthermore, in one or more embodiments, a path or parametric curve includes a continuous function that extends from an initial point to a terminal point. For example, a path includes one or more Bézier curves and/or one or more straight lines. Alternatively, a path includes other representations of curved/straight lines including Hermite curves, B-splines, non-uniform rational basis splines, Kappa-curves, Catmull-Rom splines or another parameter curve. Accordingly, a curved path includes a path with at least one Bézier curve.

Additionally, in one or more embodiments, a parametric quilt includes a grid with a plurality of parametric patches. For instance, a parametric quilt includes a plurality of parametric patches that cover a region of digital content. To illustrate, a parametric quilt includes a 4×4 grid of parametric patches of the same or different sizes for deforming a digital image. In another example, a Bézier quilt includes one or more rows (and/or column) of Bézier patches for deforming digital images. FIGS. 3A-3F and the corresponding description provide additional detail associated with generating a parametric quilt for a digital image.

In one or more embodiments, as illustrated in FIG. 2, the image warping system 102 determines a selected anchor control point 204 in a parametric quilt corresponding to the segmented parameter space 202 for warping the digital image 200. In particular, the parametric quilt includes a plurality of control points corresponding to different locations of the array of parametric patches in the segmented parameter space 202 for deforming the digital image 200. Furthermore, the image warping system 102 receives inputs to determine the selected anchor control point 204 in one or more parametric patches of the parametric quilt.

In one or more embodiments, a control point includes a point in a parametric patch that the image warping system 102 utilizes to determine Bézier deformations according to a shape of the parametric patch corresponding to the control points. In some embodiments, a control point is an anchor control point (e.g., a visible point at an edge or corner of a parametric patch with which a user interacts to modify the shape of the parametric patch) or an intermediate/interior control point within a parametric patch (e.g., control points in an interior of a parametric patch and not visible within a graphical user interface). In alternative embodiments, anchor control points include control points only at corners of a parametric patch. Modifying the position of a single control point within a parametric patch in an image editing process (e.g., deformation) causes the image warping system 102 to use the position of control points of the parametric patch to determine how to modify a corresponding image or image portion. In one or more embodiments, a coincident control point includes a control point that is shared by two or more parametric patches. For example, a control point that lies at the edge or corner of two parametric patches is a coincident control point.

According to one or more embodiments, the image warping system 102 determines a modified parametric continuity 206 of the selected anchor control point 204 in response to an input. For instance, the image warping system modifies a parametric continuity of the selected anchor control point 204 by modifying a metadata flag associated with the selected anchor control point 204. As described in more detail below with respect to FIGS. 6A-6D, the image warping system 102 determines a parametric continuity indicating a continuity (or discontinuity) at one or more edges of one or more portions of the segmented image 202.

In one or more embodiments, a parametric continuity includes a smoothness of a path or connected paths. In particular, parametric continuity is determined by the number of derivatives of a function corresponding to the path that are continuous. Parametric continuity for a path is represented as Ck, where k is the class of the continuity. For example, continuity of C0 indicates that the function representing the path is a continuous function (i.e., a curve in the path is connected at a given joint). Furthermore, a C1 function indicates that two segments connected at a joint share the same first derivative at the joint. Accordingly, the image warping system 102 performs deformations to maintain C1 continuity of original digital content so that deformed digital content has smooth transitions or connected transitions between Bézier patches according to the original digital content. Alternatively, the image warping system 102 modifies the parametric continuity at one or more points to insert/allow for sharp creases in deformed digital image content.

As illustrated in FIG. 2, the image warping system 102 generates a deformed image 208 in response to an input to deform the digital image 200. For example, the image warping system 102 deforms one or more portions of the digital image 200 according to the modified parametric continuity 206 of the selected anchor control point 204. Specifically, the image warping system 102 divides the digital image 200 into a plurality of separate portions along edges of the parametric patches in the segmented parameter space 202. To illustrate, FIGS. 3F and 7A-7B and the corresponding description provide additional detail with respect to modifying digital images according to customized parametric continuities of anchor control points in a digital image.

FIGS. 3A-3F illustrate a plurality of diagrams in connection with the image warping system 102 performing deformation operations on a digital image within a client application. For example, as shown, FIG. 3A includes a graphical user interface of a client device 300 including an image editing application 302 for editing digital images. For instance, the image editing application 302 can be an image editing application that allows a user to edit digital images or other digital content using a plurality of tools 304. In one or more embodiments, the tools 304 include a quilt warp tool 304a that allows the user to deform a digital image via a parametric quilt. Alternatively, the image editing application 302 includes the quilt warp tool 304a in a menu or other area of the image editing application 302.

Figure 3A:
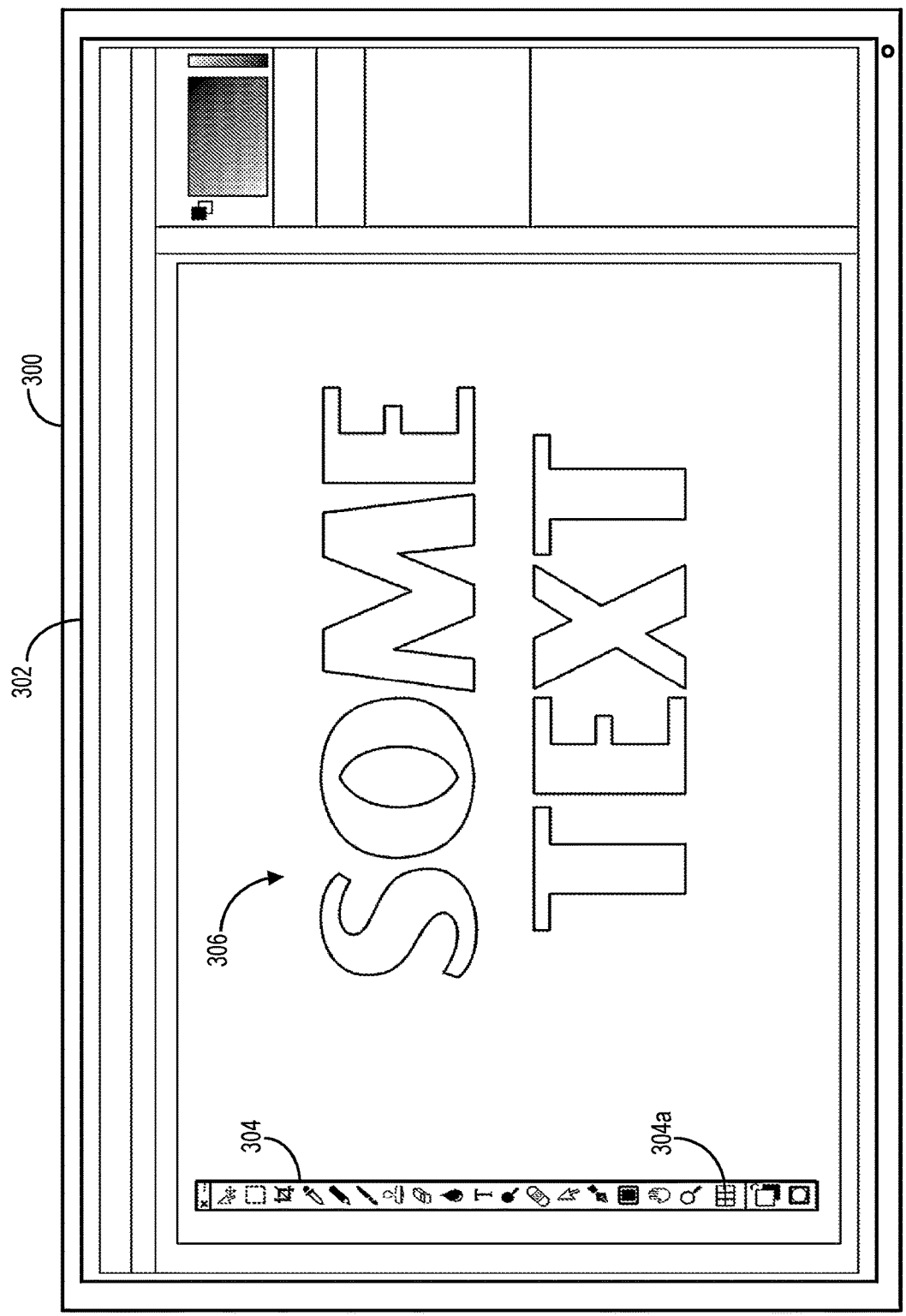
FIGS. 3A-3F illustrate diagrams for deforming a digital image via a parametric patch-based deformation process in accordance with one or more implementations.

In one or more embodiments, in response to a selection of the quilt warp tool 304a, the image warping system 102 provides an option to select a region of a digital image to deform. To illustrate, in response to a selection to deform a digital image 306 displayed within the graphical user interface of the image editing application 302. As illustrated in FIG. 3A, the digital image 306 includes digital text across a plurality of lines of text. Although the digital image 306 includes digital text, the digital image 306 can alternatively include other digital image content, such as a photograph or drawn art. Accordingly, selecting the quilt warp tool 304a causes the image warping system 102 to perform a deformation operation to deform any type of digital image content.

In response to a selection/designation of a region of the digital image 306 for deforming, the image warping system 102 processes the selected region to determine a plurality of parametric patches within a parametric quilt for the selected region. In particular, the image warping system 102 determines an order (or degree) of the parametric patches in the parametric quilt, which thus determines a number of control points in each parametric patch. For example, the image warping system 102 determines the degree of the parametric patches based on a default setting or a user preference/setting indicating the order of the parametric patches. Accordingly, the image warping system 102 provides customizable control over the level of deformation detail for deforming the digital image 306 by providing a higher or lower number of control points in each parametric patch.

Furthermore, in one or more embodiments, the image warping system 102 determines a number of parametric patches to include in the parametric quilt. For example, the image warping system 102 determines the number of parametric patches based on a default setting or a user preference indicating the number of parametric patches, which further affects the amount of control a user has over a deformation process. More specifically, a greater number of parametric patches provides a higher total number of control points across the parametric quilt without changing the number of control points within each separate parametric quilt.

Figure 3B:
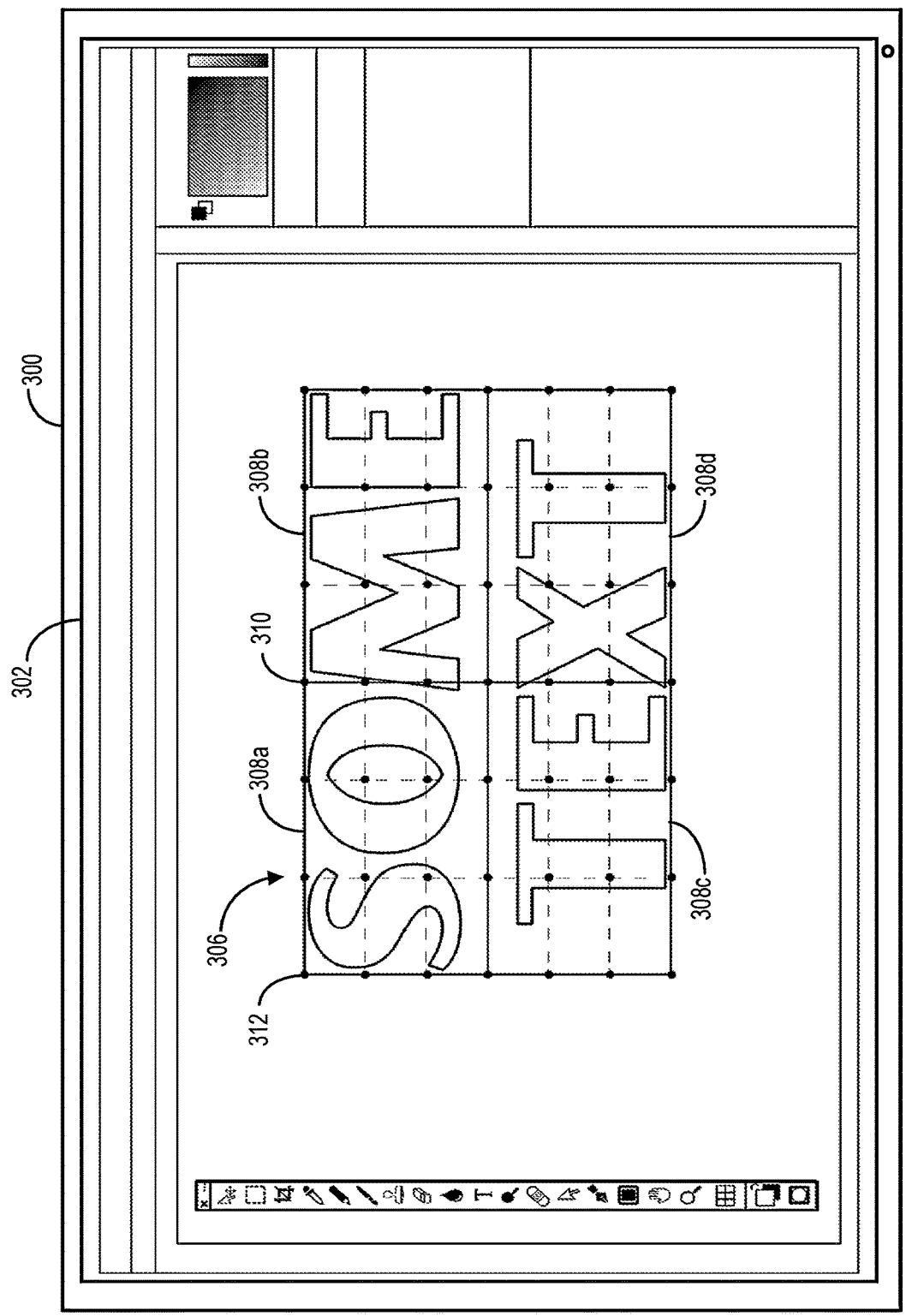

In the embodiment of FIG. 3B, the image warping system 102 generates four parametric patches for the digital image 306. In particular, the image warping system generates two rows of two Bézier patches 308a-308d. As illustrated, each of the Bézier patches 308a-308d is adjacent to at least two other Bézier patches. For instance, a first Bézier patch 308a is adjacent to a second Bézier patch 308b and a third Bézier patch 308c. Similarly, the second Bézier patch 308b is adjacent to the first Bézier patch 308a and a fourth Bézier patch 308d.

In one or more embodiments, the Bézier patches 308a-308d in FIG. 3B include bicubic Bézier patches with a plurality of control points (e.g., 16 control points each). Additionally, given that the Bézier patches 308a-308d are adjacent to other Bézier patches within the Bézier quilt, each Bézier patch includes a plurality of coincident control points. For example, a first anchor control point 310 is a coincident control point that corresponds to the first Bézier patch 308a and the second Bézier patch 308b at a corner of each corresponding patch. Changing a position of the first anchor control point 310 changes a shape of the first Bézier patch 308a and the second Bézier patch 308b. In contrast, a second anchor control point 312 corresponds to only the first Bézier patch 308a, and thus modifies the first Bézier patch 308a.

In one or more embodiments, the image warping system 102 generates the Bézier patches 308a-308d by treating the cumulative set of control points from the Bézier patches 308a-308d as a single parametric quilt (i.e., the Bézier quilt). Additionally, in some embodiments, the image warping system 102 ties redundant points at the edges together as coincident control points. The image warping system 102 converts quilt control point indices i, j into respective patch indices of a M×N sized quilt of patches using:

$$i_q = \min\left(\frac{i}{k_v}, M - 1\right)$$

$$u_q = \min\left(\frac{j}{k_u}, N - 1\right)$$

$$i_P = i - i_q k_v$$

$$j_P = j - j_q k_u$$

where the parameters of the patch are u and v, where (in parameter space) u extends across the patch and v extends down. Additionally, the indices $i_q j_q$ identify the patch within the quilt, and $i_p j_p$ indicate the control point within the patch. The values $k_u k_v$ refer to the degree (order-1) in u and v of the individual patches. Also note that M and N refer to the number of patches within the quilt.

Figure 3C:
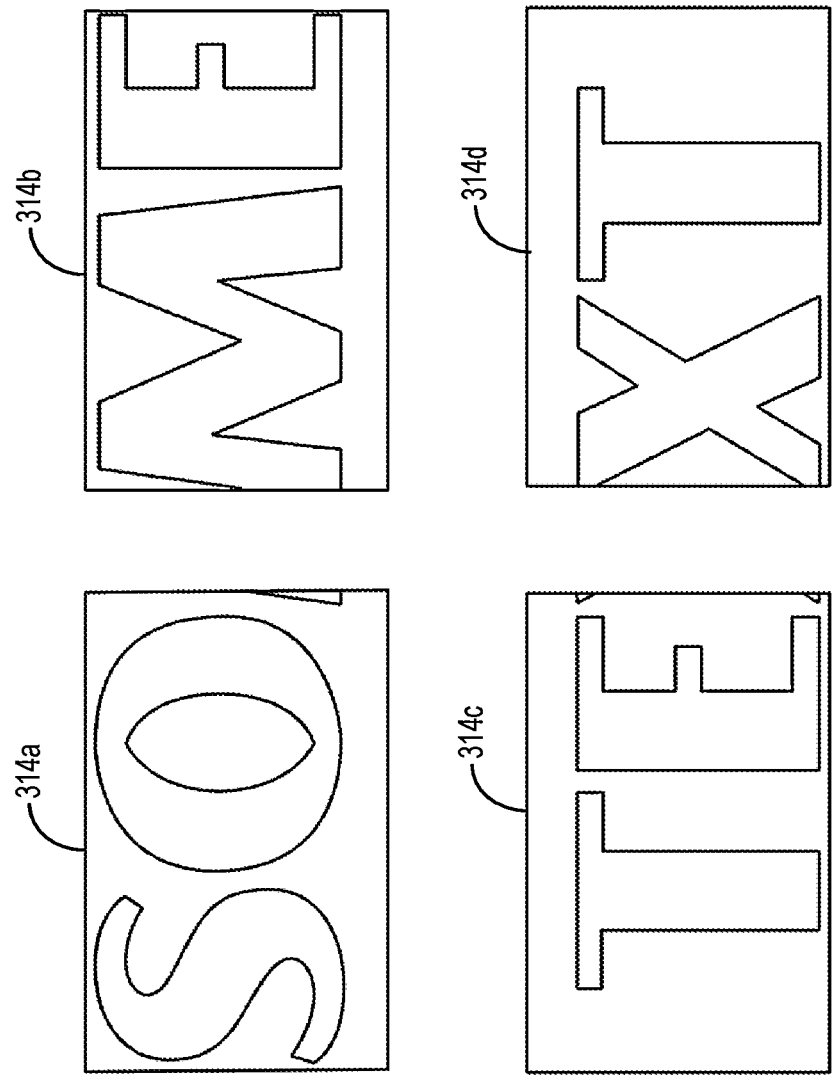

According to one or more embodiments, in response to the image warping system 102 generating the Bézier patches 308a-308d, the image warping system 102 divides the digital image 306 into a plurality of portions 314a-314d, illustrated in FIG. 3C. In particular, the portions 314a-314d correspond to the Bézier patches 308a-308d. The image warping system divides the digital image 306 to create the portions 314a-314d such that a Bézier patch corresponds to a specific image portion. To illustrate, the first Bézier patch 308a shown in FIG. 3B corresponds to a first portion 314a shown in FIG. 3C. Additionally, while FIG. 3C illustrates visual separation between the portions 314a-314d, the visual separation is for illustration purposes.

As mentioned, in one or more embodiments, the image warping system distorts digital images according to user interaction with control points. For example, the image warping system determines a plurality of different image portions contained within a digital image and then applies distortions to one or more image portions according to the user interactions. For example, in one or more embodiments, the image warping system utilizes the approaches described in U.S. Pat. No. 7,385,612 titled "DISTORTION OF RASTER AND VECTOR ARTWORK," filed May 30, 2002 to Peterson (hereinafter "Peterson"), which describes methods for deforming and/or distorting portions of raster images and/or vector images and is incorporated by reference herein in its entirety.

Figure 3D:
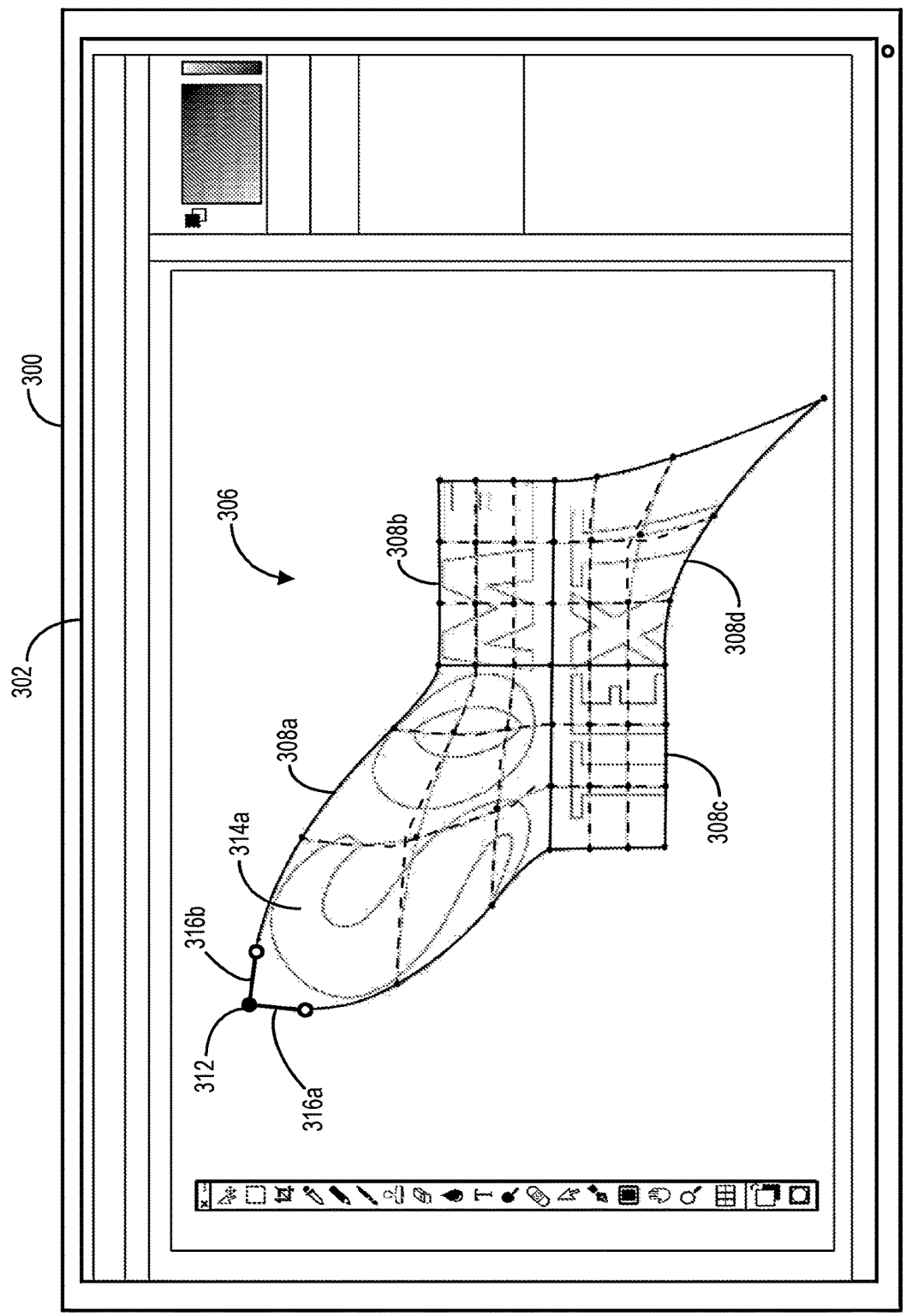

In one or more embodiments, in response to generating the Bézier patches 308a-308d and dividing the digital image 306 into a plurality of portions 314a-314d, the image warping system detects one or more inputs to modify the Bézier patches 308a-308d using one or more of the control points in the patches. For example, FIG. 3D illustrates that the image warping system 102 detects an input to modify the first Bézier patch 308a by changing the position and/or rotation of a plurality of control points corresponding to the first Bézier patch 308a. To illustrate, the image warping system 102 detects an interaction with one or more control points in the Bézier quilt to deform one or more portions of the digital image 306.

As previously described, the control points for each Bézier patch modify the corresponding Bézier patch (with the exception of coincident control points). Specifically, adjusting the second anchor control point 312 at the upper-left corner of the digital image 306 (or other non-coincident control points) causes the image warping system 102 to modify the first Bézier patch 308a. Thus, for a bicubic Bézier patch that is adjacent to two other patches, as shown in FIG. 3D, the image warping system 102 changes the position (or rotation or translation) associated with up to 9 control points without modifying other Bézier patches. In one or more additional embodiments, however, adjusting control points in a given Bézier patch indirectly modifies other Bézier patches by causing the image warping system 102 to modify control points in the other Bézier patch to maintain parametric continuity according to the parametric continuity stored for the control points.

Moreover, the image warping system 102 adjusts a rotation of a control point to modify a Bézier patch via a plurality of interactive handles. Specifically, similar to an individual Bézier curve, a control point includes rotation handles for each dimension of the Bézier patch for changing a rotation of the control point. To illustrate, the second anchor control point 312 includes a first interactive handle 316a for the x dimension and a second interactive handle 316b for the y dimension. Each handle allows adjustment of a rotation of a control point in addition to tangent information associated with the control point. Changing the position and length of the handles thus causes the image warping system 102 to change a curve vector (i.e., direction and strength) applied to a Bézier curve associated with the control point at the control point location.

After, or in connection with, a change applied to a Bézier patch using a control point, the image warping system 102 modifies a corresponding portion of the digital image. In particular, the image warping system 102 uses the changes made to the Bézier patch to determine a Bézier deformation of the corresponding image portion. For example, the image warping system 102 applies the deformation to the image portion in real-time, within a preview window, or after a selection of an option to apply the Bézier deformation to the image. As shown in FIG. 3D, the image warping system updates the first portion 314a corresponding to the first Bézier patch 308a based on the modifications to the first Bézier patch 308a.

As mentioned, in one or more embodiments the image warping system 102 deforms an image portion by using contour information associated with a Bézier patch governed by corresponding control points. Specifically, the image warping system 102 uses relocation information for control points to determine how to deform the image portion based on predefined intended behaviors of canonical locations of the control points. In one or more embodiments, the image warping system 102 utilizes the approaches described in U.S. Pat. No. 6,911,980 titled "MANIPULATION OF CURVES AND SURFACES," filed Dec. 10, 1999 to Newell et al. (hereinafter "Newell"), which describes methods for deforming digital content using Bézier patches (referred to as "Bézier shapes"), and which is incorporated by reference herein in its entirety.

In one or more embodiments, in response to determining deformations for one or more portions of a digital image, the image warping system 102 recombines the portions into a single image. To illustrate, in response to partitioning the image into logical portions stored within memory during a deformation process, the image warping system 102 recombines the portions back into a single image within memory and removes the pointers to the separate image portions. Alternatively, in response to partitioning the image into separate temporary files, the image warping system 102 recombines the separate files into a single image file.

Figure 3E:
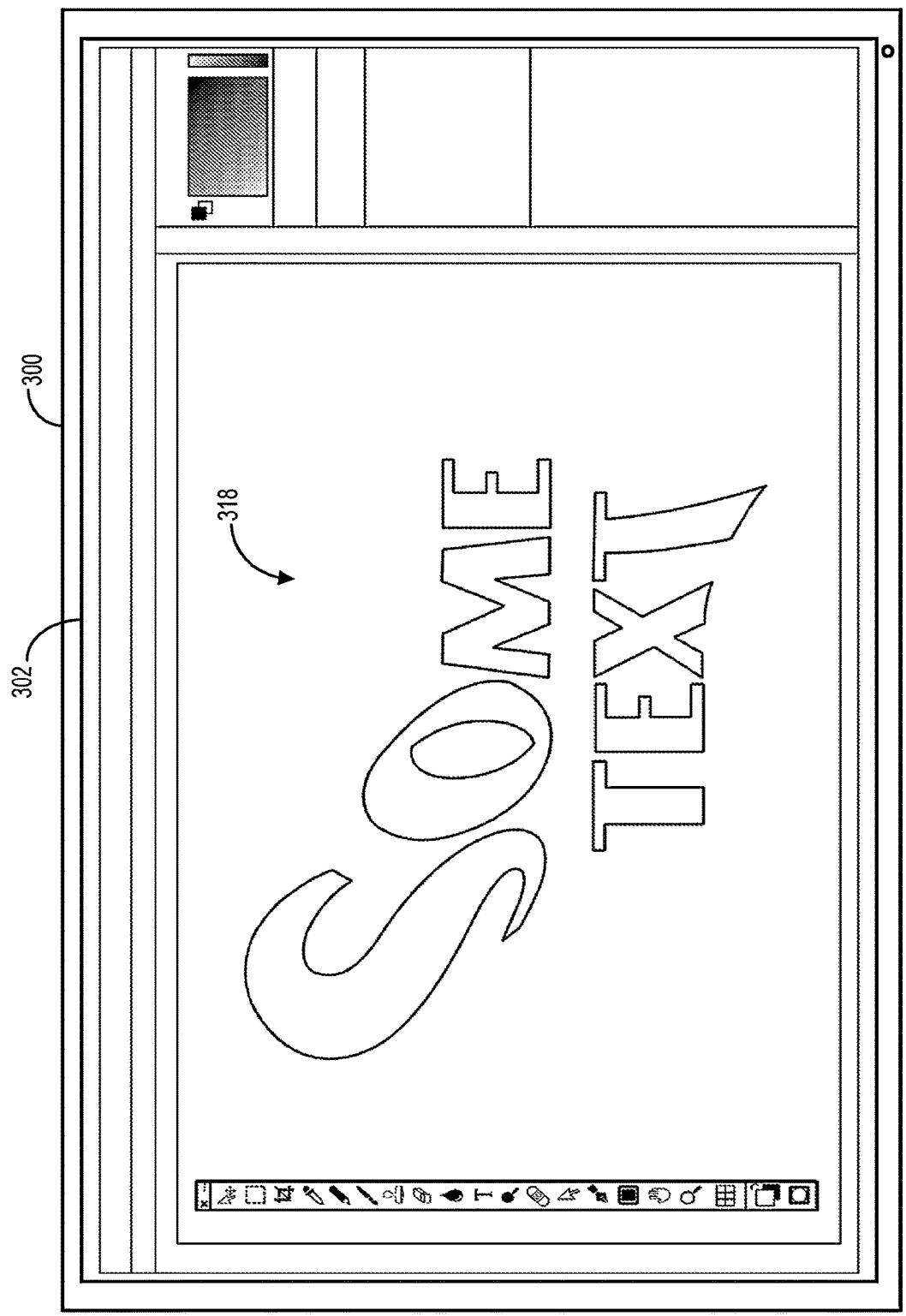

In any case, the image warping system 102 recombines the image portions to create a single digital image containing any deformations based on any modified Bézier patches during the deformation operation. FIG. 3E illustrates a modified digital image 318 including all of the deformations based on the modified Bézier patches shown in FIG. 3D. Thus, the image warping system 102 generates the modified digital image 318 and displays the modified digital image 318 on a display device of the client device 300. According to one or more embodiments, the client device 300 provides tools for making additional edits to the modified digital image 318 within the image editing application 302 and/or for storing or sharing the modified digital image 318.

As previously mentioned the image warping system 102 partitions a raster image for deformation by subdividing the raster image into a plurality of triangular "shards." In particular, based on the Bézier patches within the Bézier quilt, the image warping system 102 maps a parameter range (described with u and v coordinates) to a portion of the raster image on which a deformation is performed. For a single bicubic Bézier patch, the u, v parameters range from 0 to 1, but for a larger patch (e.g., a quilt including a plurality of patches), the image warping system 102 determines the range by the number of patches in each direction. Accordingly, each column increases the u range by one, and each row increases the v range by one.

Figure 3F:
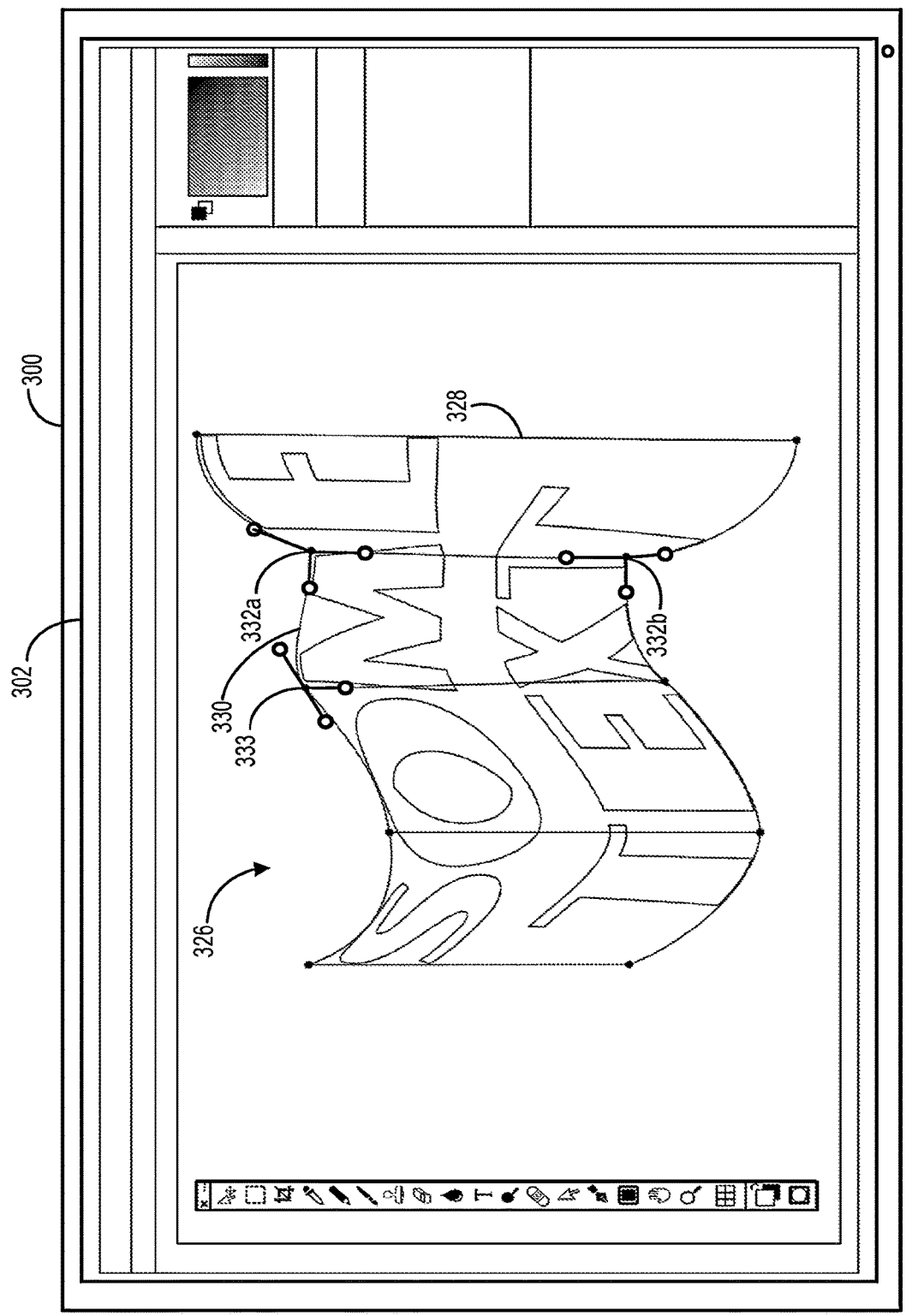

As mentioned, in one or more embodiments, the image warping system 102 provides tools for modifying a parametric continuity at portions of a digital image during a piecewise patch-based deformation operation. FIG. 3F illustrates that the client device 300 displays a digital image 326 with a first portion 328 of the digital image 326 being deformed without C1 continuity with a second portion 330 of the digital image 326 adjacent to the first portion 328. For example, in one or more embodiments, the image warping system 102 generates a parametric quilt including a plurality of anchor control points at corners of separate parametric patches associated with the first portion 328 and the second portion 330.

Specifically, FIG. 3F illustrates a first anchor control point 332a at a first corner of a first parametric patch corresponding to the first portion 328 and a second parametric patch corresponding to the second portion 330. FIG. 3F also illustrates a second anchor control point 332b at a second corner of the first parametric patch and the second parametric patch. Furthermore, as illustrated, the first anchor control point 332a and the second anchor control point 332b are coincident control points belonging to the first parametric patch and the second parametric patch.

In one or more embodiments, the image warping system 102 receives one or more inputs to change the parametric continuity at the first anchor control point 332a and the second anchor control point 332b. In particular, the image warping system 102 receives an input to break continuity (e.g., by introducing a discontinuity) at the first anchor control point 332a and the second anchor control point 332b (e.g., via corresponding interactive handles). To illustrate, the image warping system 102 stores modified continuity statuses for metadata flags associated with the anchor control points to indicate a horizontal discontinuity between the first parametric patch and the second parametric patch. Accordingly, as illustrated in FIG. 3H, the image warping system 102 deforms the first portion 328 and the second portion 330 based on modifications to one or more anchor control points in the parametric quilt corresponding to the digital image 326 without maintaining C1 continuity between the first portion 328 and the second portion 330. Furthermore, as illustrated in FIG. 3F, interactive handles for the first anchor control point 332a and the second anchor control point 332b indicate the discontinuities, while interactive handles for a third anchor control point 333 indicate C1 continuity.

Figure 4A:
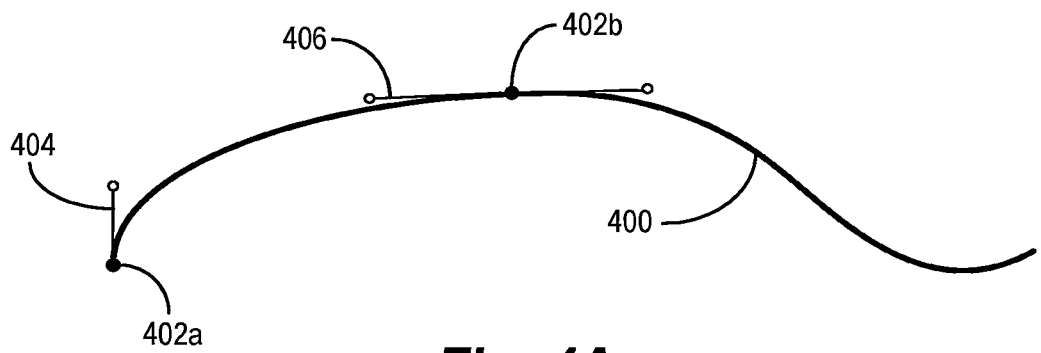
FIGS. 4A-4C illustrate diagrams of parametric curves with interactive handles and their effect on curve continuity in accordance with one or more implementations.
Figure 4B:
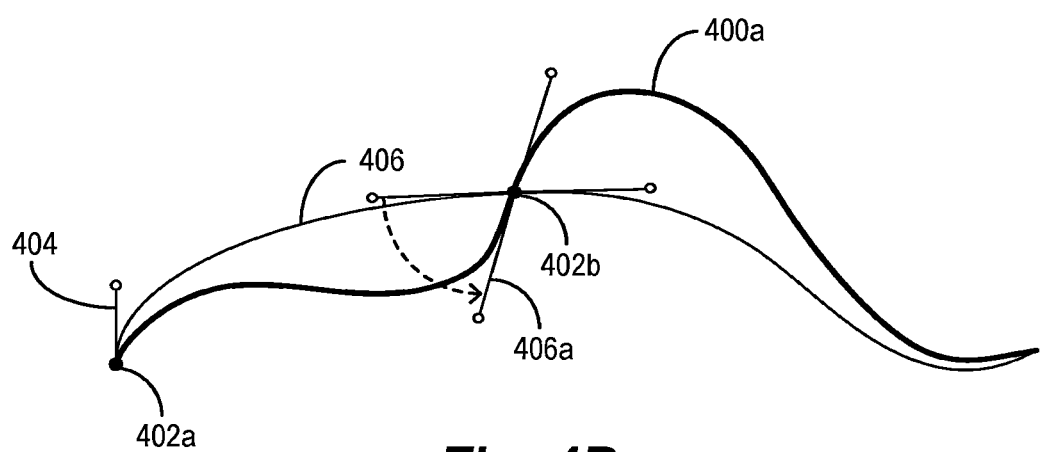
Figure 4C:
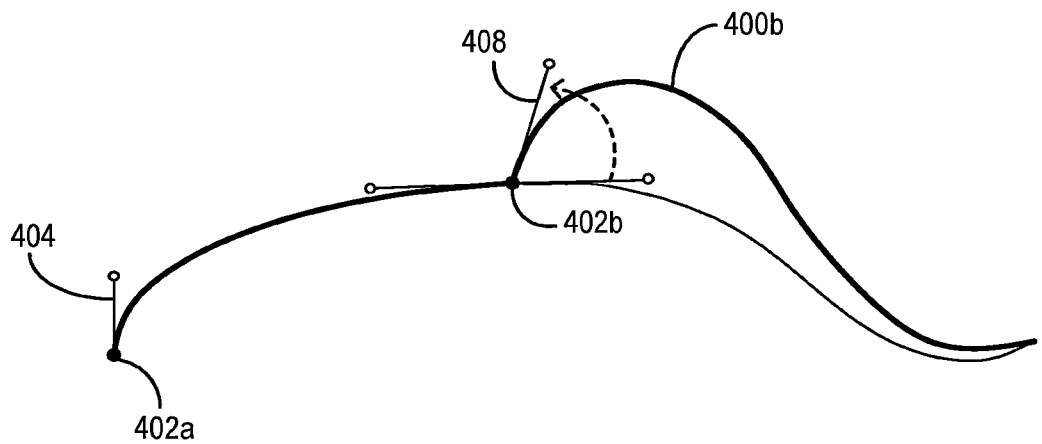

As mentioned, the image warping system 102 provides customizable parametric continuity of anchor control points in a parametric quilt for deforming digital images. FIGS. 4A-4C illustrate a plurality of Bézier curves including a plurality of control points, each control point including one or more interactive handles. For example, as illustrated in FIG. 4A, a Bézier curve 400 includes a first anchor control point 402a and a second anchor control point 402b. In one or more embodiments, the Bézier curve 400 includes two separate curves joined at the second control point 402b with C1 continuity. Additionally, as illustrated, the first anchor control point 402a includes an interactive handle 404 (e.g., a Bézier control point) to determine a shape of the Bézier curve 400 near the first anchor control point 402a. More specifically, the interactive handle 404 of the first anchor control point 402a includes a single handle extending toward a direction of the Bézier curve 400 to control a direction and strength of a curve vector associated with the Bézier curve 400 based on the first anchor control point 402.

Furthermore, in one or more embodiments, the second anchor control point 402b includes a set of interactive handles 406 (e.g., Bézier control points) to determine a shape of the Bézier curve 400 near the second anchor control point 402b. For example, the set of interactive handles 406 includes a plurality of handles extending toward the direction of the Bézier curve 400 on both sides of the second anchor control point 402b. To illustrate, the length and direction of each handle in the set of interactive handles 406 determines the strength and direction of curvature of the Bézier curve 400 on each side of the second anchor control point 402b. Furthermore, as illustrated in FIG. 4A, the image warping system 102 maintains a parametric continuity of the Bézier curve at the second anchor control point 402b in response to determining that a metadata flag associated with the second control point indicates C1 continuity at the location of the second anchor control point 402b. In one or more embodiments, if the interactive handles extending from the second anchor control point 402b are colinear with the second anchor control point 402b, the curve is C1 continuous at the second anchor control point 402b. Accordingly, in one or more embodiments, the image warping system 102 enforces the collinearity to enforce C1 continuity.

In one or more embodiments, modifying a position or length of one or more interactive handles associated with a control point modifies the shape of a corresponding Bézier curve. For example, FIG. 4B illustrates a modified Bézier curve 400a in response to modifying a position or length of one or more interactive handles of the set of interactive handles 406. Specifically, in response to modifying the set of interactive handles 406, the image warping system 102 generates the modified Bézier curve 400a based on a modified set of interactive handles 406a. For example, as illustrated, the image warping system 102 determines a new rotation of the second anchor control point 402b based on positioning of the modified set of interactive handles 406a and generates the modified Bézier curve 400a accordingly. Furthermore, the image warping system 102 maintains the parametric continuity of the modified Bézier curve 400a in response to determining that the continuity status of the corresponding metadata flag has not changed.

In one or more embodiments, the image warping system 102 modifies a parametric continuity of the second anchor control point 402b in response to an input to modify the parametric continuity. In particular, the image warping system 102 detects an interaction with the second anchor control point 402b to modify the parametric continuity. The image warping system 102 modifies the parametric continuity of the second anchor control point 402b by changing a continuity status of a metadata flag associated with the second anchor control point 402b. To illustrate, the image warping system 102 changes the continuity status to indicate discontinuity from one side of the second anchor control point 402b to the other side of the second anchor control point 402b.

According to one or more embodiments, the image warping system 102 modifies the Bézier curve 400 according to the discontinuity at the second anchor control point 402b. For instance, as illustrated in FIG. 4C, the image warping system 102 determines an interactive handle 408 by separating the set of interactive handles 406 based on the discontinuity at the second anchor control point 402b, such that the interactive handles move independently. Additionally, in response to an interaction with the interactive handle 408, the image warping system 102 modifies the corresponding portion of the Bézier curve, resulting in a modified Bézier curve 400b with a parametric discontinuity at the location of the second anchor control point 402b. To illustrate, moving the interactive handle 408 causes the right side of the curve (at the second anchor control point 402b) to deform without deforming the left side of the curve (e.g., by splitting the Bézier curve 400 into two separate Bézier curves connected at the second anchor control point 402b).

Figure 5:
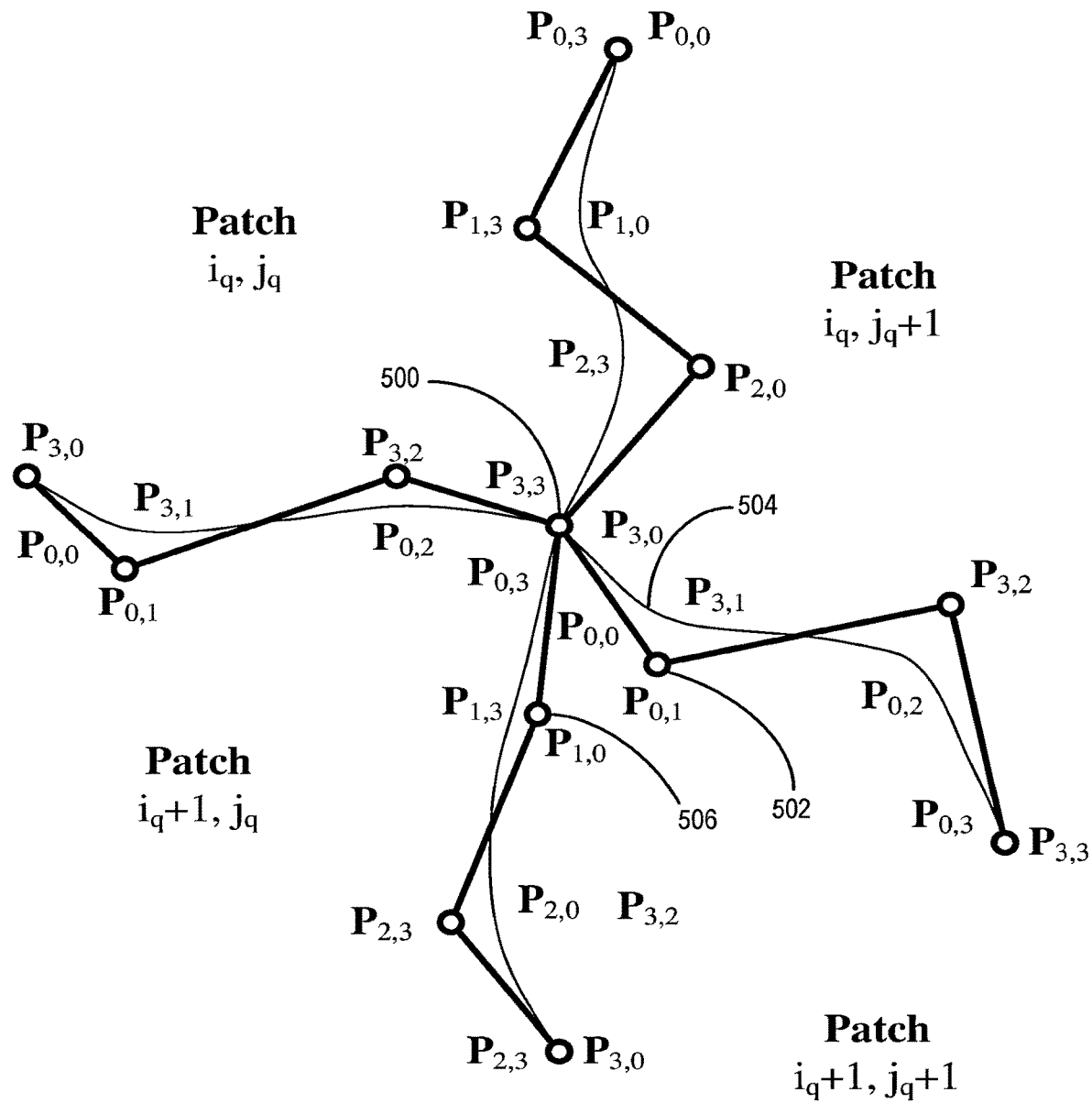
FIG. 5 illustrates a diagram of a plurality of control points in a plurality of Bézier patches in accordance with one or more implementations.

In some embodiments, the image warping system 102 determines parametric continuity of control points in a parametric quilt that includes a plurality of parametric patches. FIG. 5 illustrates a plurality of control points corresponding to a plurality of parametric curves at a coincident corner of a plurality of parametric patches in a parametric quilt. In particular, the image warping system 102 manages a parametric continuity of a first anchor control point 500 at a corner of a plurality of parametric patches. For example, the image warping system 102 determines an interaction with the first anchor control point 500 to change a parametric continuity at the first anchor control point 500. To illustrate, the image warping system 102 modifies the parametric continuity of the first anchor control point 500 to introduce a discontinuity at the first anchor control point 500 (e.g., a horizontal discontinuity).

In connection with modifying the parametric continuity of the first anchor control point 500, the image warping system 102 deforms one or more parametric curves in the parametric quilt according to the updated parametric continuity of the first anchor control point 500. For instance, in response to an interaction with the first anchor control point 500 to introduce a discontinuity between the first anchor control point 500 and a second anchor control point 502 of the parametric quilt, the image warping system 102 deforms the parametric patches in the parametric quilt according to the discontinuity. To illustrate, the image warping system 102 introduces a discontinuity between the first anchor control point 500 and a parametric curve 504 associated with the second anchor control point 502. More specifically, the image warping system 102 deforms the parametric quilt without maintaining parametric continuity between the parametric curve 504 and additional parametric curves of the parametric quilt joining at the first anchor control point 500 based on a metadata flag associated with the first anchor control point 500 and an interaction with an interactive handle associated with the first anchor control point 500.

Furthermore, based on the metadata flag associated with the first anchor control point 500 indicating vertical parametric continuity at the first anchor control point 500, the image warping system 102 maintains the vertical parametric continuity across the first anchor control point 500 according to the continuity status at the first anchor control point 500. In additional embodiments, in response to an input to move the first anchor control point 500, the image warping system 102 moves the additional points connected vertically to maintain the parametric continuity (e.g., by moving the third control point 506 with the first anchor control point 500). Thus, the image warping system 102 deforms one or more portions of a digital image corresponding to the parametric quilt according to the parametric continuity of the first anchor control point 500.

FIGS. 6A-6D illustrate a plurality of interactive handles corresponding to an anchor control point according to a plurality of different parametric continuities. For example, the image warping system 102 determines interactive handles with movement behaviors based on the corresponding parametric continuity of an anchor control point. Specifically, the image warping system 102 generates different interactive handles for anchor control points with different continuity statuses.

In one or more embodiments, as illustrated in FIGS. 6A-6D the image warping system 102 determines a continuity status for a metadata flag of an anchor control point in response to an input. In particular, the image warping system 102 detects an input to change a parametric continuity of an anchor control point. According to one or more embodiments, the image warping system 102 changes or sets a metadata flag for the anchor control point by setting the continuity status indicated by the metadata flag to one of a plurality of continuity statuses. To illustrate, the image warping system 102 modifies the metadata flag to indicate full continuity (e.g., parametric continuity across all axes associated with the anchor control point), partial continuity (e.g., parametric continuity across one axis or set of handles and discontinuity across another axis or other set of handles associated with the anchor control point), or full discontinuity (e.g., parametric discontinuity across all axes associated with the anchor control point).

Figure 6A:
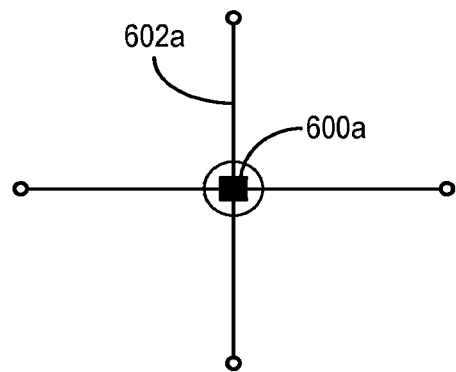
FIGS. 6A-6D illustrates a plurality of interactive handles for control points used to modify parametric continuity in accordance with one or more implementations.

FIG. 6A illustrates a first anchor control point 600a with interactive handles 602a corresponding to the parametric continuity of the first anchor control point 600a. For instance, the image warping system 102 determines that the parametric continuity of the first anchor control point 600a includes full continuity across all axes associated with the first anchor control point 600a. To illustrate, the image warping system 102 determines that the first anchor control point 600a has full continuity by accessing a metadata flag associated with the first anchor control point 600a. Additionally, in one or more embodiments, points at the ends of the interactive handles 602a correspond to adjacent Bézier control points in the parameter space. Furthermore, in some embodiments, the Bézier control points and the interactive handles are visible when the first anchor control point 600a is selected and hidden when the first anchor control point 600a is not selected.

In one or more embodiments, the image warping system 102 stores a continuity status in a metadata flag of the first anchor control point 600a. Specifically, the image warping system 102 stores information associated with parametric continuities associated with anchor control points (including a parametric continuity of the first anchor control point 600a) separately from the anchor control points. For example, the image warping system 102 stores an array (or other metadata object such as a matrix) of metadata flags for anchor control points in each parametric patch in a parametric quilt for deforming a digital image. More specifically, a metadata flag for the first anchor control point 600a indicates a continuity status at the location of the first anchor control point 600a within the parametric patch/quit, (e.g., via a specific numerical value mapped to the continuity status). Accordingly, the image warping system 102 modifies a parametric continuity at the first anchor control point 600a by modifying the corresponding metadata flag in the array to indicate the updated continuity status.

Additionally, the image warping system 102 specifies the interactive handles 602a according to the full continuity status associated with the first anchor control point 600a. Accordingly, interactions with any of the interactive handles 602a maintains parametric continuity along any parametric curves that intersect the first anchor control point 600a along a u-axis or a v-axis. To illustrate, the interactive handles 602a include a movement behavior that locks the interactive handles 602a at 90-degree angles from each other to maintain parametric continuity across the axes that intersect the first anchor control point 600a.

Figure 6B:
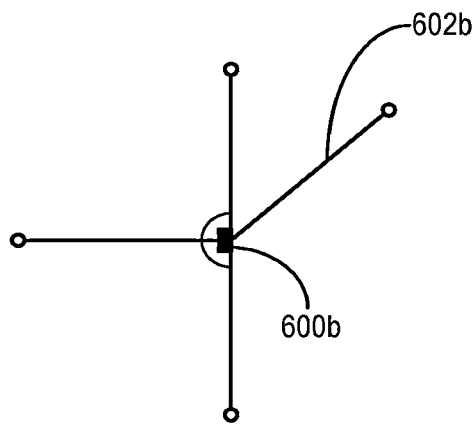

FIG. 6B illustrates a second anchor control point 600b with interactive handles 602b corresponding to an additional parametric continuity. In particular, the image warping system 102 determines that the parametric continuity of the second anchor control point 600b includes a partial continuity across a single axis that intersects the second anchor control point 600b. Additionally, the partial continuity indicates C1 continuity across the indicated axis (e.g., a vertical axis) and discontinuity across an additional axis (e.g., a horizontal axis). For instance, the image warping system 102 accesses a metadata flag of the second anchor control point 600b to determine the continuity status indicating partial continuity across a particular axis associated with the second anchor control point 600b.

The image warping system 102 also determines the interactive handles 602b according to the partial continuity status associated with the second anchor control point 600b. Specifically, the image warping system 102 determines that interactions with any of the interactive handles 602b maintains partial parametric continuity depending on the handle and/or axis associated with the interaction. For example, in response to determining that the partial continuity status corresponds to continuity across a vertical axis and discontinuity across a horizontal axis, an interaction with an interactive handle along the horizontal axis provides independent movement of the interactive handle. Furthermore, an interaction with an interactive handle along the vertical axis maintains continuity vertically by locking the vertical interactive handles together (e.g., 180 degrees from each other in a rocker arm motion).

Figure 6C:
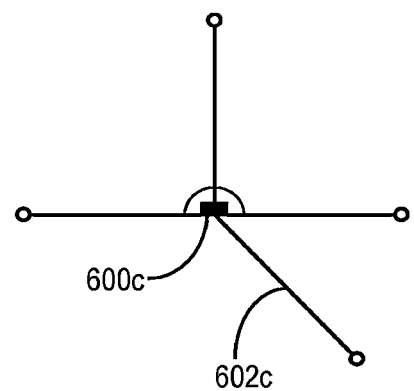

FIG. 6C illustrates a third anchor control point 600c with interactive handles 602c corresponding to an additional partial parametric continuity. For example, the image warping system 102 determines that the parametric continuity of the third anchor control point 600c includes a partial continuity across a horizontal axis and discontinuity across a vertical axis. Accordingly, the image warping system 102 provides the interactive handles 602c with independent movement of interactive handles along the vertical axis while locking the horizontal interactive handles together. Thus, the third anchor control point 600c provides continuity for deformations along the horizontal axis based on the horizontal interactive handles and discontinuity for deformations along the vertical axis.

Figure 6D:
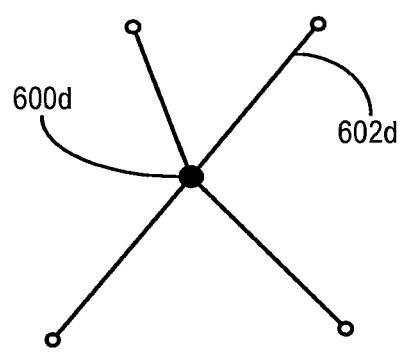

FIG. 6D illustrates a fourth anchor control point 600d with interactive handles 602d corresponding to a full parametric discontinuity. In particular, the image warping system 102 determines that the fourth anchor control point 600d has a continuity status indicating no C1 continuity across any axes associated with the fourth anchor control point 600d. Furthermore, the image warping system 102 determines the interactive handles 602d by allowing independent movement behavior of each interactive handle associated with the fourth anchor control point 600d. Thus, in response to an interaction with one of the interactive handles 602d, the image warping system 102 moves the corresponding interactive handle without changing a position of any of the other interactive handles. Accordingly, the image warping system 102 provides independent movement and deformation of any parametric curve associated with the fourth anchor control point 600d without requiring parametric continuity with any other parametric curve associated with the fourth anchor control point 600d.

Additionally, in one or more embodiments, the image warping system 102 provides different visual indicators associated with different continuity statuses of anchor control points. Specifically, as illustrated in FIGS. 6A-6D, the image warping system 102 provides different icons for display in connection with each of the anchor control points to indicate the continuity status of each anchor control point. To illustrate, the image warping system 102 provides a square icon indicating an anchor control point with full continuity (e.g., the first anchor control point 600a of FIG. 6A). Additionally, the image warping system 102 provides a rectangular icon (e.g., a half-square) oriented in a specific direction to indicate partial continuity in the corresponding direction (e.g., a vertical rectangle indicating vertical continuity of the second anchor control point 600b in FIG. 6B or a horizontal rectangle indicating horizontal continuity of the third anchor control point 600c in FIG. 6C). Furthermore, the image warping system 102 provides a circular icon indicating an anchor control point with full discontinuity (e.g., the fourth anchor control point 600d of FIG. 6D). Although FIGS. 6A-6D illustrate specific icons representing different continuity statuses, in alternative embodiments, the image warping system 102 utilizes different visual indicators, including other shapes, different colors, different sizes, or other visual indicators.

According to one or more embodiments, the image warping system 102 provides continuity customization of a predetermined subset of control points in a parametric quilt. For example, the image warping system 102 provides continuity customization of anchor control points at corners of parametric patches in a parametric quilt. In additional embodiments, the image warping system 102 provides continuity customization of anchor control points corresponding to endpoints of parametric curves. To illustrate, the image warping system 102 provides continuity customization of control points along an edge of a parametric patch (e.g., between two corner control points).

In one or more embodiments, the image warping system 102 determines available continuity statuses for anchor control points based on the positioning of the anchor control points within a parametric patch or parametric quilt. For example, the image warping system 102 provides possible parametric continuities depending on whether the parametric continuities are possible for the corresponding anchor control points. To illustrate, for anchor control points at corners of a parametric quilt, the image warping system 102 determines that available statuses at the corners include a status to enforce a 90 degree angle or a status to allow arbitrary angles at the corners. Additionally, the image warping system 102 determines that anchor control points at edges of a parametric quilt toggle between u or v discontinuity (depending on whether the anchor control point belongs to a vertical or horizontal edge) or full continuity. In one or more additional embodiments, the image warping system 102 determines that anchor control points rotate between all four available continuity statuses (e.g., no continuity, v continuity, u continuity, or full continuity).

In one or more embodiments, the image warping system 102 provides a default continuity status for anchor control points during creation of a parametric quilt. Specifically, the image warping system 102 sets full discontinuity as default continuity statuses for an anchor control point at a corner of a parametric patch. Additionally, the image warping system 102 sets u discontinuity (e.g., horizontal discontinuity) as default continuity statuses of anchor control points at vertical edges and v discontinuity (e.g., vertical discontinuity) as default statuses of anchor control points at horizontal edges to provide smooth edges while allowing independent movement along the interior of the parametric quilt. In alternative embodiments, the image warping system 102 sets different default continuity statuses for various types of anchor control points, as may serve a particular implementation.

Furthermore, in one or more embodiments, the image warping system 102 assigns continuity statuses to anchor control points in response to a warp split action. In particular, in some instances, the image warping system 102 detects an input to split or edit a warp selection (e.g., by splitting a parametric quilt into a plurality of parametric quilts or by adding additional anchor control points to a parametric quilt). In one or more embodiments, the image warping system 102 determines parametric continuities of new anchor control points based on the default continuity statuses according to respective positions of the new anchor control points. Alternatively, the image warping system 102 extends continuity statuses of adjacent anchor control points by replicating the continuity statuses to the new anchor control points.

Figure 7A:
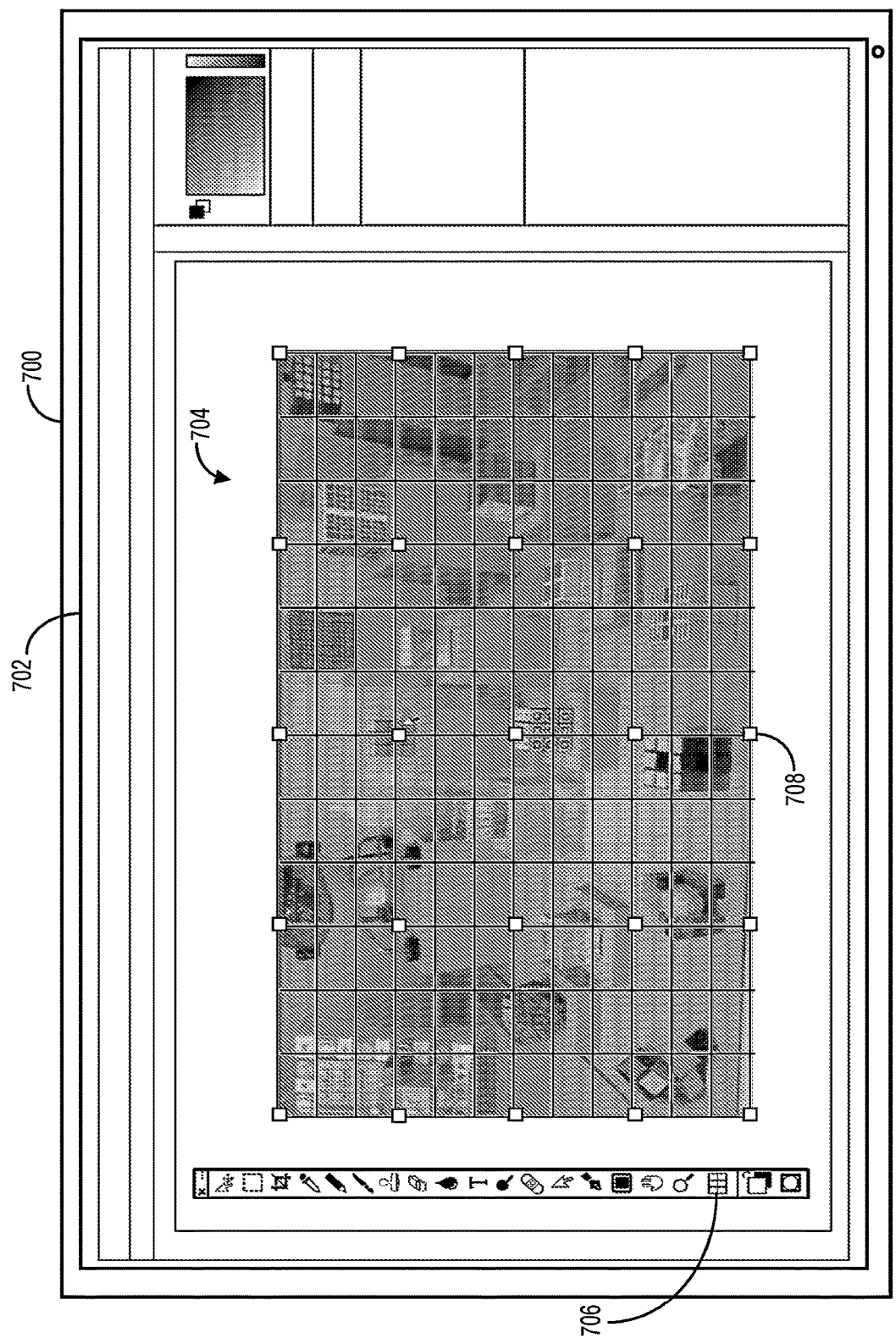
FIGS. 7A-7B illustrate a plurality of graphical user interfaces for deforming a digital image via a parametric patch-based deformation process in accordance with one or more implementations.
Figure 7B:
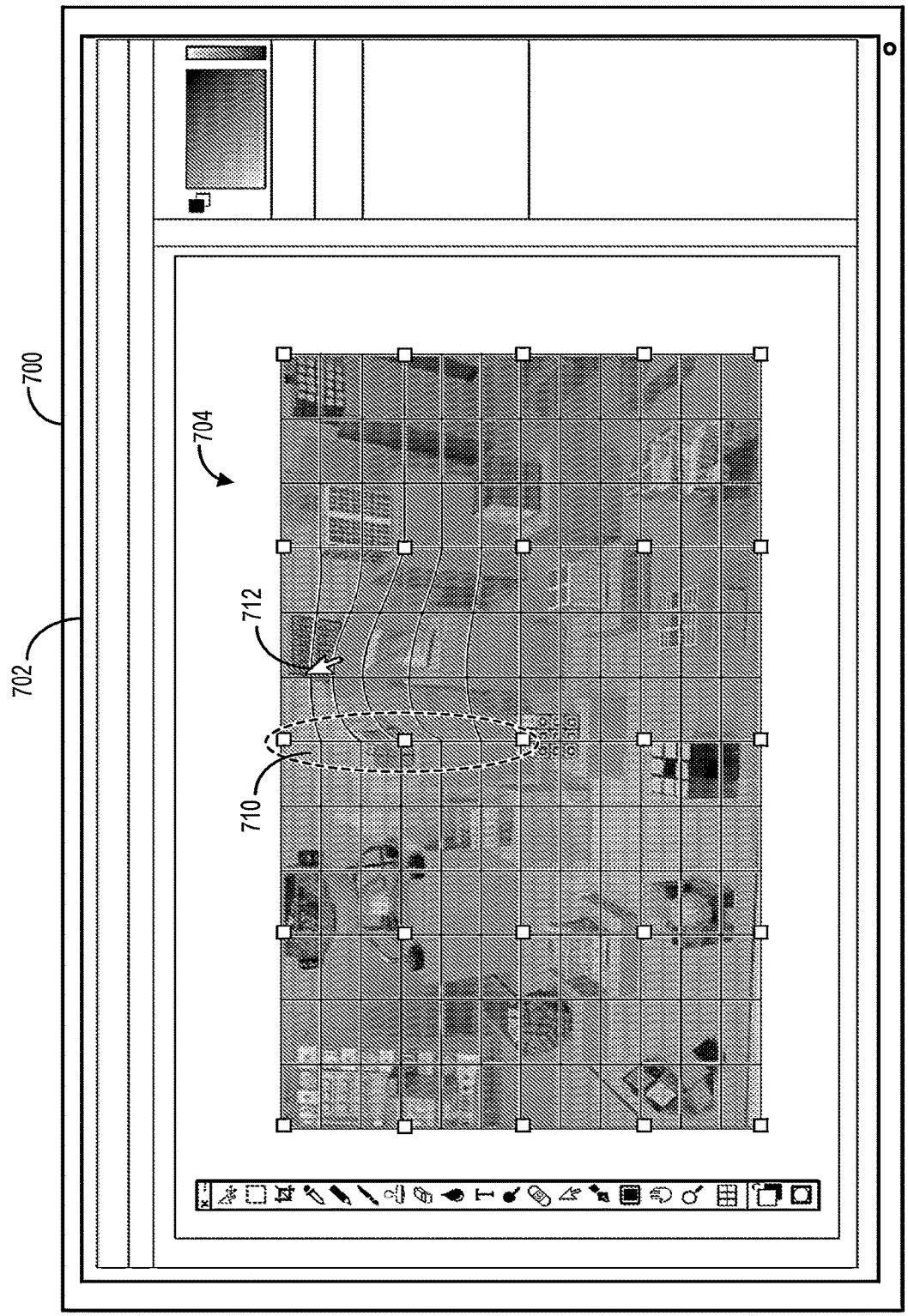

FIGS. 7A-7B illustrate graphical user interfaces of a client device 700 including an image editing application 702 for deforming digital images via a piecewise patch-based deformation process. Specifically, the client device 700 displays a digital image 704 for editing within the image editing application 702. Additionally, as illustrated in FIG. 7A, in response to a selection of a quilt warp tool 706, the image warping system 102 generates a parametric quilt 708 including a plurality of parametric patches corresponding to different portions of the digital image 704. As illustrated, the parametric patches include a plurality of control points for deforming the digital image 704 based on a plurality of parametric curves within the parametric patches.

In response to a selection of one or more anchor control points in the parametric quilt 708, the client device 700 provides an option to modify a parametric continuity of the selected anchor control point(s). For example, the image warping system 102 provides a variety of methods for interacting with control points in a parametric quilt for deforming a digital image. In particular, the client device 700 displays one or more options for modifying a parametric continuity of the selected anchor control point(s) in connection with displaying the parametric quilt 708.

To illustrate, the image warping system 102 provides an option to modify a parametric continuity of an anchor control point via a modifier key (e.g., a space bar or a control key). Alternatively, the image warping system 102 provides an option to modify a parametric continuity of an anchor control point via a context menu (e.g., display via right clicking the anchor control point). In additional examples, the image warping system 102 provides a toolbar option within the graphical user interface in response to selecting the quilt warp tool 706. Additionally, in one or more embodiments, the image warping system 102 provides options to rotate through a plurality of available parametric continuities for a given anchor control point (or group of anchor control points) or to directly select a particular parametric continuity.

In response to a selection of a parametric continuity for one or more anchor control points, the image warping system 102 deforms the digital image 704 according to the selected parametric continuity in connection with requests to deform the digital image 704. For example, as illustrated in FIG. 7B, the image warping system 102 detects that a group of anchor control points 710 between two separate parametric patches have a partial parametric continuity to maintain vertical continuity and no horizontal continuity. Accordingly, in response to an input 712 to deform a portion of the digital image 704 in a specific direction (e.g., based on a direction of movement of the input 712), the image warping system 102 deforms the portion of the digital image 704 independently from another portion of the digital image 704 on the other side of the group of anchor control points 710 due to the horizontal discontinuity status of the group of anchor control points 710, thereby introducing a crease or hard line into the digital image 704. Alternatively, in response to determining that the group of anchor control points 710 has a horizontal continuity status, the image warping system 102 deforms the other portion of the digital image 704 to maintain the horizontal continuity across the group of anchor control points 710.

Furthermore, in one or more embodiments, the image warping system 102 maintains parametric continuity between some portions of a digital image and not between other portions of the digital image according to different parametric continuity statuses of different anchor control points. To illustrate, in response to determining that a second group of anchor control points to the right of the input 712 has a horizontal continuity status, the image warping system 102 maintains horizontal continuity to the right of the input 712, but not to the left (e.g., based on the group of anchor control points 710). Thus, the image warping system 102 provides customizable parametric continuity of different portions of a digital image deformation process via the independently established parametric continuities of anchor control points in a parametric quilt.

In one or more additional embodiments, the image warping system 102 determines a parametric continuity of non-interactive control points at an edge of a parametric patch based on one or more anchor control points. For example, in response to determining that a first anchor control point and a second anchor control point have a first parametric continuity, the image warping system 102 determines parametric continuities of the edge control points between the first anchor control point and the second anchor control point also have the first parametric continuity. Thus, as illustrated in FIG. 7B, the image warping system 102 provides parametric discontinuity along an edge between two parametric patches based on the discontinuity status of the group of anchor control points 710. In additional embodiments, the image warping system 102 determines a parametric continuity for an edge control point based on the parametric continuity of the closest anchor control point. In some embodiments, in response to determining that an edge control point is the same distance from two different anchor control points with different parametric continuities, the image warping system 102 determines a parametric continuity for the edge control point based on a default value.

Figure 8:
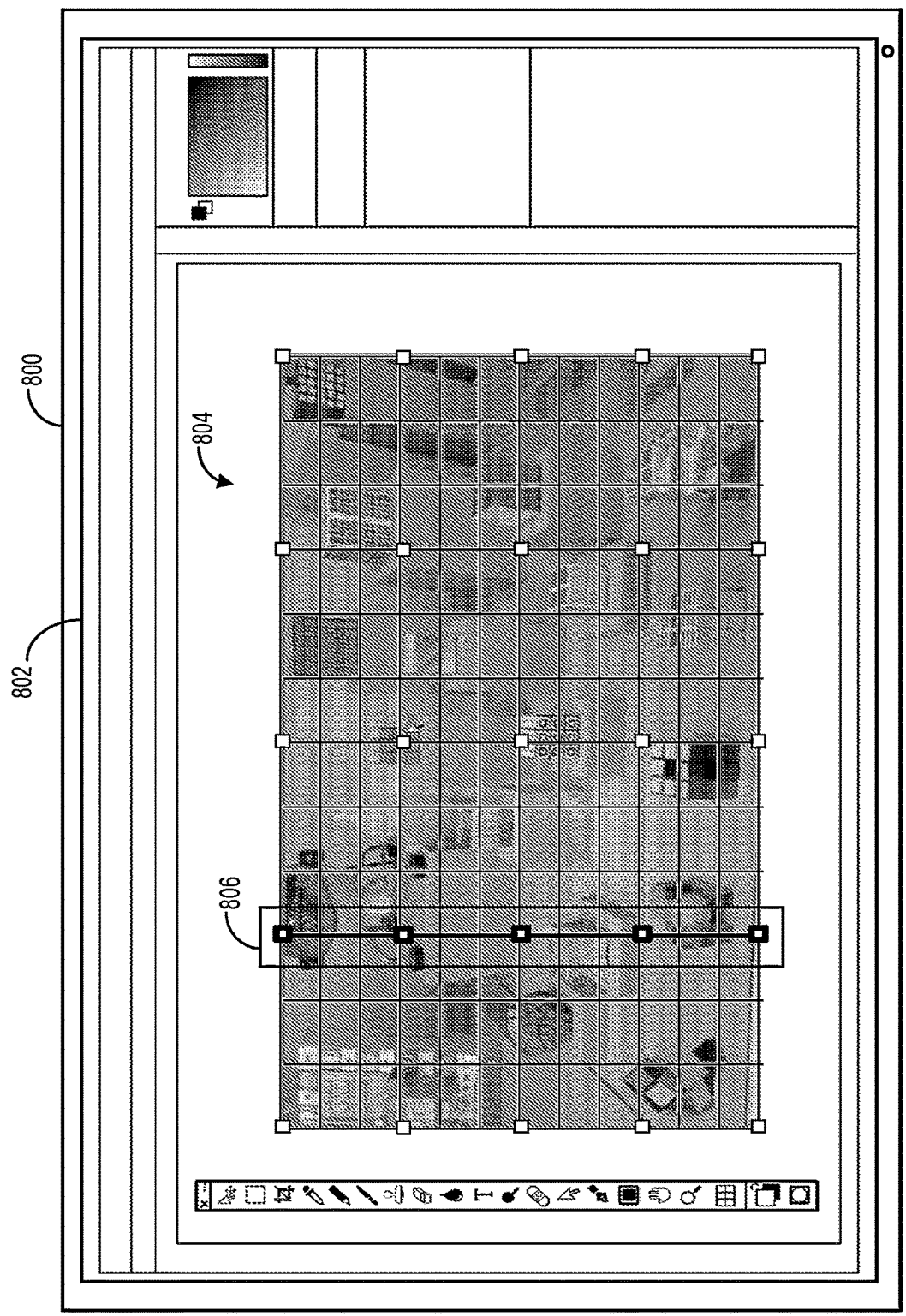
FIG. 8 illustrates a graphical user interface for deforming a digital image via a parametric patch-based deformation process in accordance with one or more implementations.

As mentioned, the image warping system 102 provides the ability to set a parametric continuity of individual anchor control points or groups of anchor control points. For example, FIG. 8 illustrates a graphical user interface of a client device 800 including an image editing application 802 for deforming a digital image 804. To illustrate, the client device 800 detects a selection of a group of anchor control points 806 in a parametric quilt. As an example, the image warping system 102 detects the selection of the group of anchor control points 806 in response to a selection dragging a rectangle around the group of anchor control points 806 or based in a plurality of separate inputs (e.g., shift-clicking the anchor control points). In some embodiments, the group of anchor control points 806 selected via the graphical user interface correspond to corners of a plurality of parametric patches in the parametric quilt.

In one or more embodiments, the client device 800 also detects an input to set a parametric continuity of the group of anchor control points 806 at the same time (e.g., based on a single continuity status selection). Specifically, the client device 800 detects an input to modify a parametric continuity of the group of anchor control points 806. In response to the request to modify the parametric continuity, the image warping system 102 updates the metadata flags associated with the group of anchor control points 806 to the selected continuity status. To illustrate, the image warping system 102 changes the continuity statuses of the group of anchor control points 806 to a partial continuity indicating a horizontal discontinuity. More specifically, the image warping system 102 changes continuity statuses of the anchor control points at the upper and lower edges of the parametric quilt and the anchor control points in the interior of the parametric quilt to the updated parametric continuity.

According to one or more embodiments, the image warping system 102 modifies a parametric continuity of a selected anchor control point or group of anchor control points automatically in response to a selection of the anchor control point or group of anchor control points. For example, the image warping system 102 determines a new parametric continuity of the selected anchor control point(s) based on a location and/or a selection shape of the anchor control point(s). To illustrate, the image warping system 102 detects that a shape of the group of anchor control points 806 is a vertical selection. Accordingly, the image warping system 102 automatically determines the new continuity status of the anchor control points to have vertical continuity and horizontal discontinuity. Additionally, the image warping system 102 automatically determines a new continuity status of a group of anchor control points to include horizontal continuity and vertical discontinuity based on the group of anchor control points having a horizontal selection shape.

Furthermore, in one or more embodiments, the image warping system 102 determines a shape of a plurality of anchor control points in a plurality of directions. For example, in response to determining that a selected group of anchor control points has a higher number of anchor control points in a specific direction (e.g., a selection of 2×6 anchor control points), the image warping system 102 utilizes the corresponding direction to set the parametric continuity. To illustrate, the image warping system 102 sets a partial continuity with continuity along a vertical direction and discontinuity along a horizontal direction in response to determining that the general shape of the selection includes a vertical rectangular shape.

Figure 9:
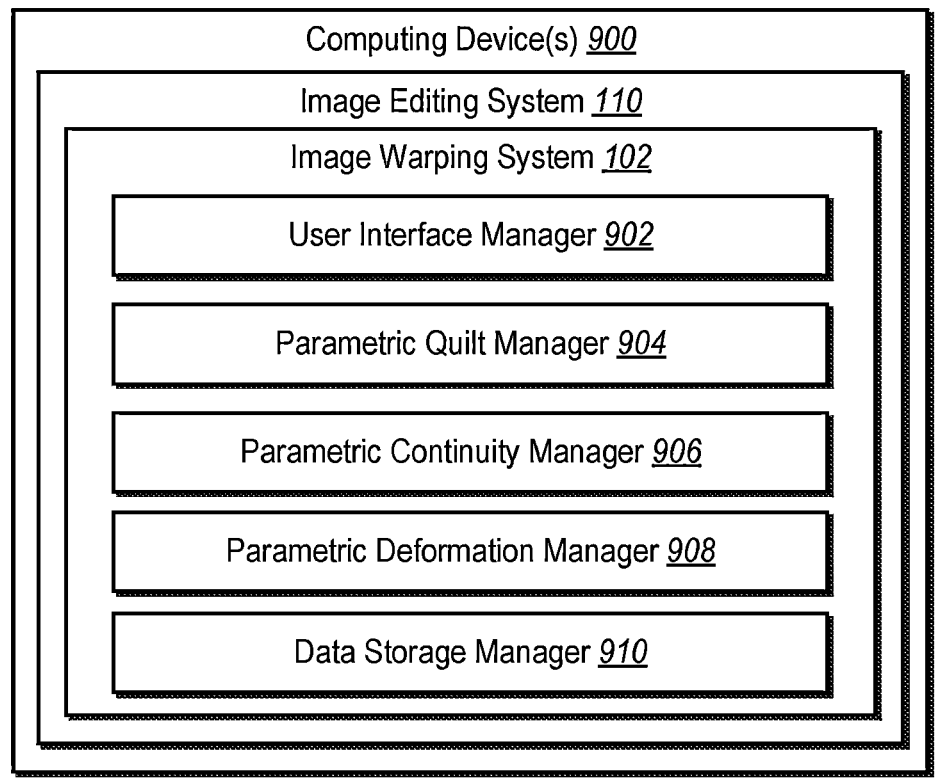
FIG. 9 illustrates a diagram of the image warping system of FIG. 1 in accordance with one or more implementations.

FIG. 9 illustrates a detailed schematic diagram of an embodiment of the image warping system 102 described above. As shown, the image warping system 102 is implemented in an image editing system 110 on computing device(s) 900 (e.g., a client device and/or server device as described in FIG. 1, and as further described below in relation to FIG. 11). Additionally, the image warping system 102 includes, but is not limited to, a user interface manager 902, a parametric quilt manager 904, a parametric continuity manager 906, a parametric deformation manager 908, and a data storage manager 910. In one or more embodiments, the image warping system 102 is implemented on any number of computing devices. For example, image warping system can be implemented in a distributed system of server devices for digital images. The image warping system 102 can also be implemented within one or more additional systems. Alternatively, the image warping system 102 can be implemented on a single computing device such as a single client device.

In one or more embodiments, each of the components of the image warping system 102 is in communication with other components using any suitable communication technologies. Additionally, the components of the image warping system 102 are capable of being in communication with one or more other devices including other computing devices of a user, server devices (e.g., cloud storage devices), licensing servers, or other devices/systems. It will be recognized that although the components of the image warping system 102 are shown to be separate in FIG. 9, any of the subcomponents may be combined into fewer components, such as into a single component, or divided into more components as may serve a particular implementation. Furthermore, although the components of FIG. 9 are described in connection with the image warping system 102, at least some of the components for performing operations in conjunction with the image warping system 102 described herein may be implemented on other devices within the environment.

In some embodiments, the components of the image warping system 102 include software, hardware, or both. For example, the components of the image warping system 102 include one or more instructions stored on a computer-readable storage medium and executable by processors of one or more computing devices (e.g., the computing device(s) 900). When executed by the one or more processors, the computer-executable instructions of the image warping system 102 cause the computing device(s) 900 to perform the operations described herein. Alternatively, the components of the image warping system 102 include hardware, such as a special purpose processing device to perform a certain function or group of functions. Additionally, or alternatively, the components of the image warping system 102 include a combination of computer-executable instructions and hardware.

Furthermore, the components of the image warping system 102 performing the functions described herein with respect to the image warping system 102 may, for example, be implemented as part of a stand-alone application, as a module of an application, as a plug-in for applications, as a library function or functions that may be called by other applications, and/or as a cloud-computing model. Thus, the components of the image warping system 102 may be implemented as part of a stand-alone application on a personal computing device or a mobile device. Alternatively, or additionally, the components of the image warping system 102 may be implemented in any application that provides digital image modification, including, but not limited to ADOBE® ILLUSTRATOR®, ADOBE PHOTOSHOP®, and ADOBE® CREATIVE CLOUD® software.

As mentioned, the image warping system 102 includes a user interface manager 902 to facilitate the generation and display of content within a user interface of one or more applications on a client device. Additionally, the user interface manager 902 manages user interactions with digital images and/or portions of a parametric quilt to deform the digital images in piecewise patch-based deformation operations. For example, the user interface manager 902 provides tools or controls for modifying parametric patches, parametric curves, parametric continuities of anchor control points, deformation paths and digital images via an image editing application to deform the specific digital content in one or more ways.

In one or more embodiments, the image warping system 102 includes a parametric quilt manager 904 to manage parametric quilts associated with deforming digital images. In particular, the parametric quilt manager 904 generates a parametric quilt including a plurality of parametric patches in connection with deforming a digital image or a portion of a digital image. Furthermore, the parametric quilt manager 904 generates a plurality of control points in a parametric quilt for deforming a digital image.

According to one or more embodiments, the image warping system 102 includes a parametric continuity manager 906 to manage the parametric continuity at locations of a parametric quilt in a deformation operation. Specifically, the parametric continuity manager 906 stores continuity statuses for a plurality of anchor control points in a parametric quilt by setting a plurality of metadata flags in a metadata object associated with the anchor control points. For example, the parametric continuity manager 906 determines default parametric continuities of anchor control points in a parametric quilt. Additionally, the parametric continuity manager 906 determines parametric continuities of anchor control points in connection with user inputs by communicating with the user interface manager 902.

The image warping system 102 also includes a parametric deformation manager 908 to manage deformation of a digital image. For instance, the image warping system 102 determines deformations of portions of a digital image in response to interactions with one or more anchor control points or other portions of a parametric quilt. Additionally, the image warping system 102 determines deformations of portions of a digital image based on parametric continuities of anchor control points of the parametric quilt based on continuity statuses stored in metadata associated with the anchor control points.

The image warping system 102 also includes a data storage manager 910 (that comprises a non-transitory computer memory) that stores and maintains data associated with deforming digital content using a plurality of parametric patches. For example, the data storage manager 910 stores locations of anchor control points in a parametric quilt. Additionally, the data storage manager 910 stores metadata flags indicating parametric continuity of the anchor control points. Furthermore, the data storage manager 910 stores information associated with deforming digital images, segmenting digital images into portions, and recombining portions of a digital image into a modified digital image.

Figure 10:
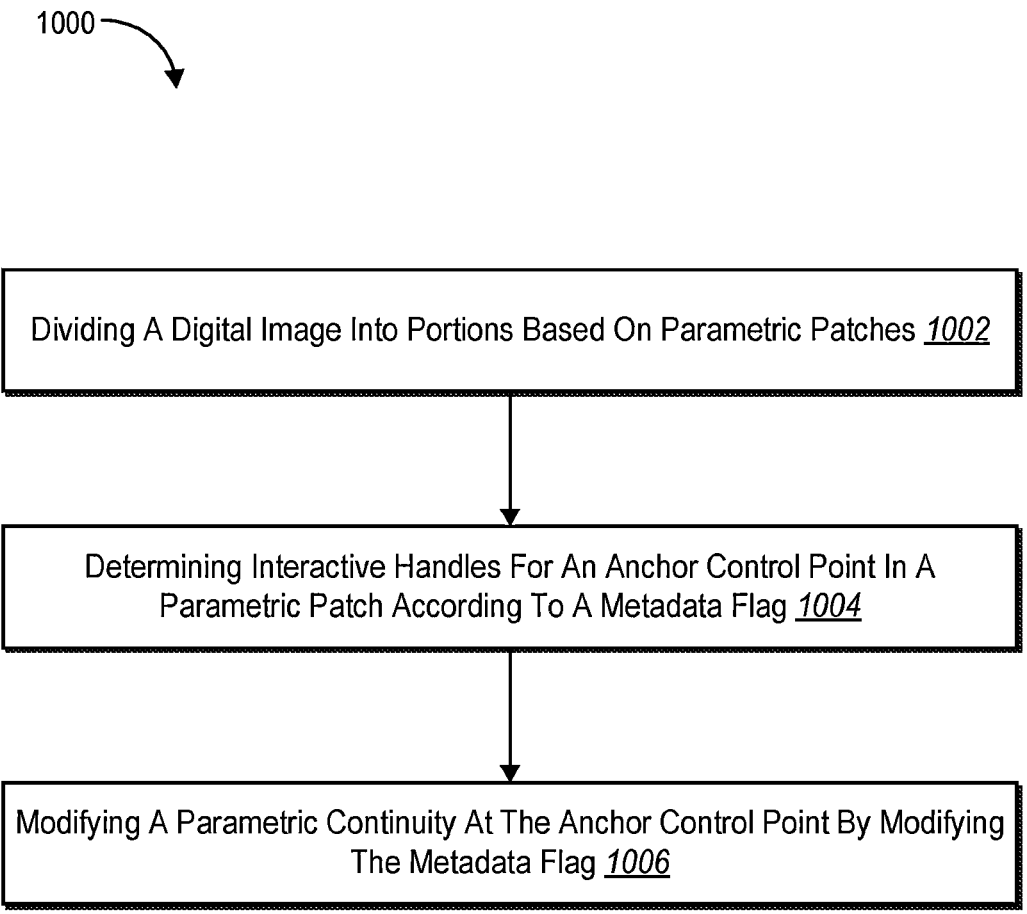
FIG. 10 illustrates a flowchart of a series of acts for modifying parametric continuity at an anchor control point in a parametric patch in accordance with one or more implementations.

Turning now to FIG. 10, this figure shows a flowchart of a series of acts 1000 of modifying parametric continuity at an anchor control point in a parametric patch. While FIG. 10 illustrates acts according to one embodiment, alternative embodiments may omit, add to, reorder, and/or modify any of the acts shown in FIG. 10. The acts of FIG. 10 are part of a method. Alternatively, a non-transitory computer readable medium comprises instructions, that when executed by one or more processors, cause the one or more processors to perform the acts of FIG. 10. In still further embodiments, a system includes a processor or server configured to perform the acts of FIG. 10.

As shown, the series of acts 1000 includes an act 1002 of dividing a digital image into portions based on parametric patches. For example, act 1002 involves dividing a digital image into a plurality of portions based on a plurality of parametric patches within a parametric quilt corresponding to the digital image. In some embodiments, act 1002 involves generating the parametric quilt including the plurality of parametric patches corresponding to the plurality of portions of the digital image in response to a request to deform a digital image. To illustrate, act 1002 involves dividing the digital image into the first portion and the second portion based on positions of a first parametric patch and a second parametric patch of the plurality of parametric patches relative to the digital image. Furthermore, act 1002 involves generating a plurality of control points in the plurality of parametric patches.

The series of acts 1000 also includes an act 1004 of determining interactive handles for an anchor control point in a parametric patch according to a metadata flag. For example, act 1004 involves determining, for an anchor control point corresponding to a parametric patch of the plurality of parametric patches, a set of interactive handles corresponding to a metadata flag for a parametric continuity of a first portion and a second portion of the plurality of portions of the digital image. In one or more embodiments, act 1004 involves determining, for anchor control points at a plurality of corners of the plurality of parametric patches, sets of interactive handles corresponding to metadata flags for parametric continuities of the plurality of portions of the digital image.

In some embodiments, act 1004 involves determining a continuity status of the metadata flag corresponding to the parametric continuity of the first portion and the second portion at a position of the anchor control point. Additionally, act 1004 involves providing, for display at a display device, the set of interactive handles comprising a movement behavior according to the continuity status, the movement behavior.

In one or more embodiments, act 1004 involves determining a plurality of interactive handles adjustable according to a continuity status of the metadata flag of the parametric continuity of the first portion and the second portion. Act 1004 further involves providing, for display at a display device, the plurality of interactive handles with the anchor control point. Additionally, act 1004 also involves providing, for display at the display device, an icon based on the continuity status of the metadata flag in connection with the anchor control point.

In some embodiments, act 1004 involves determining, for the anchor control point at the corner of the first parametric patch and the second parametric patch, a set of interactive handles comprising a movement behavior corresponding to an initial parametric continuity prior to modifying the parametric continuity of the anchor control point.

Additionally, the series of acts 1000 includes an act 1006 of modifying a parametric continuity at the anchor control point by modifying the metadata flag. For example, act 1006 involves modifying the parametric continuity between the first portion of the digital image and the second portion of the digital image by modifying a metadata flag of the anchor control point. In one or more embodiments, act 1006 involves modifying, in response to a user input for an anchor control point at a corner of a first parametric patch and a second parametric patch of the plurality of parametric patches, a parametric continuity between a first portion of the digital image corresponding to the first parametric patch and a second portion of the digital image corresponding to the second parametric patch by modifying a metadata flag of the anchor control point.

For example, act 1006 involves determining, via a graphical user interface, an input to modifying the parametric continuity of the anchor control point. Additionally, act 1006 involves modifying a continuity status of the metadata flag of the anchor control point in response to the input. In one or more embodiments, act 1006 involves cycling the metadata flag through a plurality of continuity statuses in response to a plurality of successive inputs to modify the parametric continuity of the anchor control point.

According to one or more embodiments, act 1006 involves setting a continuity status of the metadata flag to a selected continuity status of a plurality of continuity statuses comprising a full continuity status, a partial continuity status, or a full discontinuity status. For example, act 1006 involves setting, in response to an input via a graphical user interface displaying the digital image, the parametric continuity of the first portion and the second portion at the anchor control point to indicate no parametric continuity between the first portion and the second portion at the anchor control point. Alternatively, act 1006 involves setting, in response to an input via a graphical user interface displaying the digital image, the parametric continuity of the first portion and the second portion at the anchor control point to indicate parametric continuity along only a single axis between the first portion and the second portion at the anchor control point. According to one or more embodiments, act 1006 involves setting, in response to an input via a graphical user interface displaying the digital image, the parametric continuity of the first portion and the second portion at the anchor control point to indicate parametric continuity along two axes between the first portion and the second portion at the anchor control point.

In one or more embodiments, act 1006 involves determining an initial continuity status of the metadata flag of the anchor control point at the corner of the first parametric patch and the second parametric patch. Act 1006 also involves modifying a continuity status of the metadata flag to a selected continuity status in response to the user input. Act 1006 further involves detecting an interaction with an interaction handle of a set of interaction handles of the anchor control point at the corner of the first parametric patch and the second parametric patch. Act 1006 also involves deforming, in response to the interaction with the interaction handle, the first portion of the digital image without deforming the second portion of the digital image according to a modified parametric continuity of the metadata flag.

According to one or more embodiments, act 1006 involves determining, in response to the user input for the anchor control point, an updated continuity status of the metadata flag changing an initial parametric continuity of the anchor control point to an updated parametric continuity. Act 1006 further involves providing, for display at a display device, a visual indicator indicating the updated parametric continuity for the anchor control point.

In some embodiments, the series of acts 1000 includes setting an initial continuity status of the metadata flag of an anchor control point of a plurality of anchor control points in the plurality of parametric patches based on a position of the anchor control point in the parametric quilt. In some embodiments, the series of acts 1000 includes determining a selection of a plurality of anchor control points comprising the anchor control point at the corner of the first parametric patch and the second parametric patch. Additionally, the series of acts 1000 includes setting continuity status of the plurality of anchor control points based on the selection of the plurality of anchor control points.

In one or more embodiments, the series of acts 1000 also includes modifying the first portion or the second portion according to a modified parametric continuity of the anchor control point in response to an interaction with an interactive handle of the set of interactive handles.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
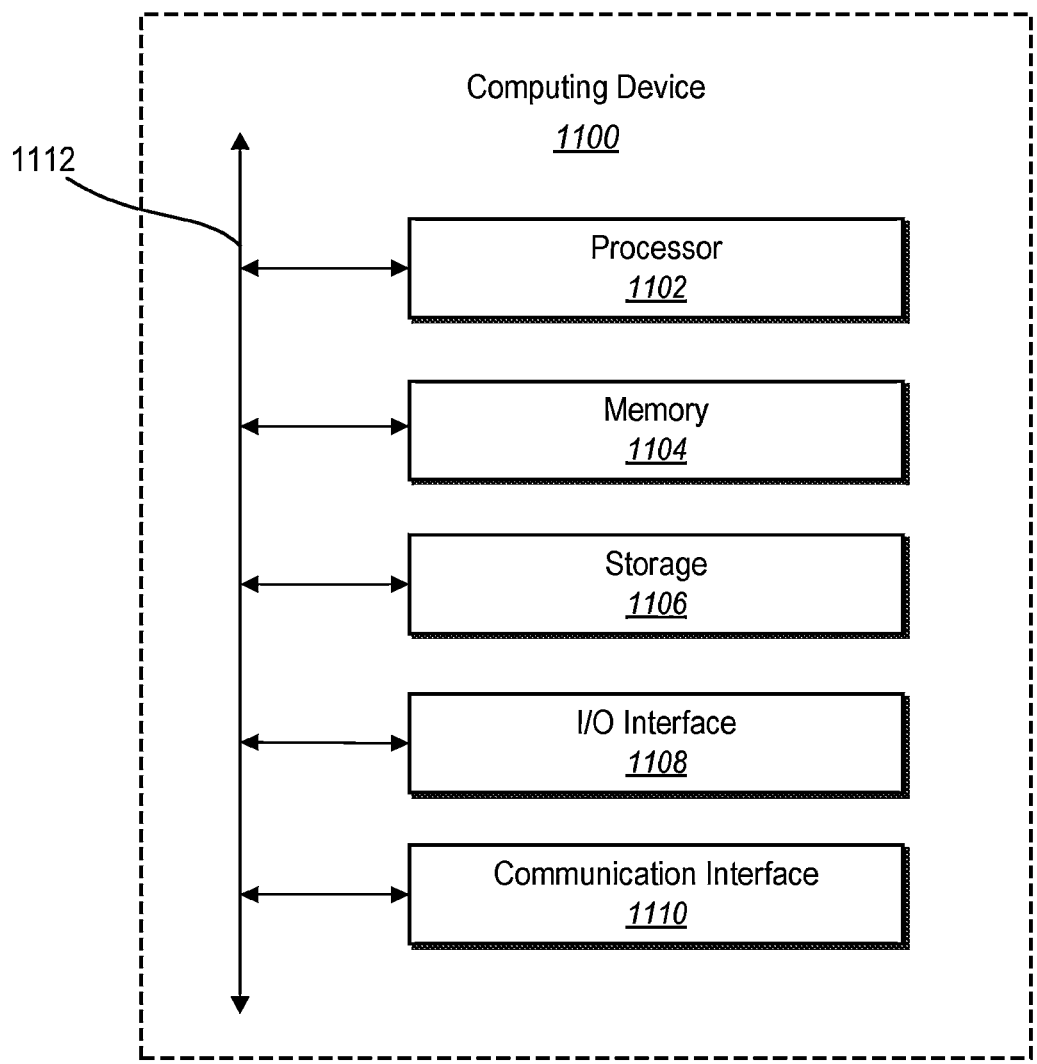
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
dividing, by at least one processor, a digital image into a plurality of portions based on a plurality of parametric patches within a parametric quilt corresponding to the digital image;
determining, by the at least one processor and for an anchor control point corresponding to a parametric patch of the plurality of parametric patches, a set of interactive handles corresponding to a metadata flag for a parametric continuity of a first portion and a second portion of the plurality of portions of the digital image; and
modifying, by the at least one processor, the parametric continuity between the first portion of the digital image and the second portion of the digital image by modifying a metadata flag of the anchor control point.

2. The method of claim 1, wherein determining the set of interactive handles comprises:
determining a plurality of interactive handles adjustable according to a continuity status of the metadata flag of the parametric continuity of the first portion and the second portion; and
providing, for display at a display device, the plurality of interactive handles with the anchor control point.

3. The method of claim 2, wherein determining the set of interactive handles comprises providing, for display at the display device, an icon based on the continuity status of the metadata flag in connection with the anchor control point.

4. The method of claim 1, wherein modifying the parametric continuity comprises:
determining, via a graphical user interface, an input to modifying the parametric continuity of the anchor control point; and
modifying a continuity status of the metadata flag of the anchor control point in response to the input.

5. The method of claim 4, wherein modifying the parametric continuity comprises cycling the metadata flag through a plurality of continuity statuses in response to a plurality of successive inputs to modify the parametric continuity of the anchor control point.

6. The method of claim 1, wherein modifying the parametric continuity comprises setting, in response to an input via a graphical user interface displaying the digital image, the parametric continuity of the first portion and the second portion at the anchor control point to indicate no parametric continuity between the first portion and the second portion at the anchor control point.

7. The method of claim 1, wherein modifying the parametric continuity comprises setting, in response to an input via a graphical user interface displaying the digital image, the parametric continuity of the first portion and the second portion at the anchor control point to indicate parametric continuity along only a single axis between the first portion and the second portion at the anchor control point.

8. The method of claim 1, wherein modifying the parametric continuity comprises setting, in response to an input via a graphical user interface displaying the digital image, the parametric continuity of the first portion and the second portion at the anchor control point to indicate parametric continuity along two axes between the first portion and the second portion at the anchor control point.

9. The method of claim 1, further comprising modifying the first portion or the second portion according to a modified parametric continuity of the anchor control point in response to an interaction with an interactive handle of the set of interactive handles.

10. A system comprising:
a memory component; and
a processing device coupled to the memory component, the processing device to perform operations comprising:
dividing, in connection with a request to deform a digital image, the digital image into a plurality of portions based on a plurality of parametric patches within a parametric quilt corresponding to the digital image;
determining, for anchor control points at a plurality of corners of the plurality of parametric patches, sets of interactive handles corresponding to metadata flags for parametric continuities of the plurality of portions of the digital image; and
modifying, in response to a user input for an anchor control point at a corner of a first parametric patch and a second parametric patch of the plurality of parametric patches, a parametric continuity between a first portion of the digital image corresponding to the first parametric patch and a second portion of the digital image corresponding to the second parametric patch by modifying a metadata flag of the anchor control point.

11. The system of claim 10, wherein determining the sets of interactive handles comprises determining, for the anchor control point at the corner of the first parametric patch and the second parametric patch, a set of interactive handles comprising a movement behavior corresponding to an initial parametric continuity prior to modifying the parametric continuity of the anchor control point.

12. The system of claim 11, wherein modifying the parametric continuity comprises:
determining an initial continuity status of the metadata flag of the anchor control point at the corner of the first parametric patch and the second parametric patch; and
modifying a continuity status of the metadata flag to a selected continuity status in response to the user input.

13. The system of claim 12, wherein the operations further comprise:
detecting an interaction with an interaction handle of a set of interaction handles of the anchor control point at the corner of the first parametric patch and the second parametric patch; and
deforming, in response to the interaction with the interaction handle, the first portion of the digital image without deforming the second portion of the digital image according to a modified parametric continuity of the metadata flag.

14. The system of claim 10, wherein modifying the parametric continuity comprises setting a continuity status of the metadata flag to a selected continuity status of a plurality of continuity statuses comprising a full continuity status, a partial continuity status, or a full discontinuity status.

15. The system of claim 10, wherein the operations comprise setting an initial continuity status of the metadata flag of an anchor control point of a plurality of anchor control points in the plurality of parametric patches based on a position of the anchor control point in the parametric quilt.

16. The system of claim 10, wherein modifying the parametric continuity comprises:
determining a selection of a plurality of anchor control points comprising the anchor control point at the corner of the first parametric patch and the second parametric patch; and
setting continuity status of the plurality of anchor control points based on the selection of the plurality of anchor control points.

17. A non-transitory computer readable medium comprising instructions, which when executed by a processing device, cause the processing device to perform operations comprising:
dividing a digital image into a plurality of portions based on a plurality of parametric patches within a parametric quilt corresponding to the digital image;
determining, for an anchor control point corresponding to a parametric patch of the plurality of parametric patches, a set of interactive handles corresponding to a metadata flag for a parametric continuity of a first portion and a second portion of the plurality of portions of the digital image; and
modifying, in response to a user input for the anchor control point, the parametric continuity between the first portion of the digital image and the second portion of the digital image by modifying a metadata flag of the anchor control point.

18. The non-transitory computer readable medium of claim 17, wherein dividing the digital image into the plurality of portions comprises dividing the digital image into the first portion and the second portion based on positions of a first parametric patch and a second parametric patch of the plurality of parametric patches relative to the digital image.

19. The non-transitory computer readable medium of claim 17, wherein determining the set of interactive handles comprises:
determining a continuity status of the metadata flag corresponding to the parametric continuity of the first portion and the second portion at a position of the anchor control point; and
providing, for display at a display device, the set of interactive handles comprising a movement behavior according to the continuity status, the movement behavior.

20. The non-transitory computer readable medium of claim 17, wherein modifying the parametric continuity comprises:
determining, in response to the user input for the anchor control point, an updated continuity status of the metadata flag changing an initial parametric continuity of the anchor control point to an updated parametric continuity; and
providing, for display at a display device, a visual indicator indicating the updated parametric continuity for the anchor control point.

* * * * *